(12) United States Patent
Haruta et al.

(10) Patent No.: US 10,303,164 B2
(45) Date of Patent: May 28, 2019

(54) REMOTE CONTROL DEVICE

(71) Applicant: YAMAHA HATSUDOKI KABUSHIKI KAISHA, Iwata-shi, Shizuoka (JP)

(72) Inventors: Yugo Haruta, Shizuoka (JP); Hiroaki Yoshiyama, Shizuoka (JP); Hajime Adachi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/504,491

(22) PCT Filed: May 28, 2015

(86) PCT No.: PCT/JP2015/065432
§ 371 (c)(1),
(2) Date: Feb. 16, 2017

(87) PCT Pub. No.: WO2016/027544
PCT Pub. Date: Feb. 25, 2016

(65) Prior Publication Data
US 2017/0235303 A1     Aug. 17, 2017

(30) Foreign Application Priority Data

Aug. 18, 2014  (JP) ................. 2014-166260

(51) Int. Cl.
*G05D 1/00*       (2006.01)
*G05D 1/02*       (2006.01)
(Continued)

(52) U.S. Cl.
CPC ........... *G05D 1/0016* (2013.01); *B64C 13/20* (2013.01); *B64C 27/04* (2013.01); *B64C 39/02* (2013.01);
(Continued)

(58) Field of Classification Search
CPC ....... B64C 27/04; B64C 27/57; B64C 39/024; B64D 1/18; B64D 43/00; B64D 47/08;
(Continued)

(56) References Cited

U.S. PATENT DOCUMENTS

2004/0245378 A1    12/2004  Nonami et al.
2009/0069957 A1*   3/2009   Nakamura ............ B64C 39/024
                                                             701/3
(Continued)

FOREIGN PATENT DOCUMENTS

CN         102417037 A        4/2012
CN         103699135 A   *    4/2014
(Continued)

OTHER PUBLICATIONS

Official Communication issued in International Patent Application No. PCT/JP2015/065432, dated Aug. 18, 2015.
(Continued)

*Primary Examiner* — Thomas G Black
*Assistant Examiner* — Ce Li Li
(74) *Attorney, Agent, or Firm* — Keating and Bennett, LLP

(57) ABSTRACT

A remote control device for an unmanned helicopter includes an orientation sensor that detects a flight orientation of the unmanned helicopter, a GPS antenna and a GPS receiver that detect speed information of the unmanned helicopter, and a CPU that detects a flight distance of the unmanned helicopter by integrating the speed information. A memory stores information concerning a base point of the unmanned helicopter. Based on a flight orientation of the unmanned helicopter and a flight distance of the unmanned helicopter, which is obtained by integration of the speed information, the CPU determines a relative position, which indicates a position of the unmanned helicopter with respect
(Continued)

to the base point, and controls the flight of unmanned helicopter based on the relative position.

13 Claims, 10 Drawing Sheets

(51) Int. Cl.
    *B64D 1/18*     (2006.01)
    *B64C 27/04*     (2006.01)
    *B64C 39/02*     (2006.01)
    *G01S 19/52*     (2010.01)
    *B64C 13/20*     (2006.01)
    *G01C 21/16*     (2006.01)

(52) U.S. Cl.
    CPC .............. *B64C 39/024* (2013.01); *B64D 1/18* (2013.01); *G01C 21/16* (2013.01); *G01S 19/52* (2013.01); *G05D 1/0202* (2013.01); *B64C 2201/024* (2013.01); *B64C 2201/146* (2013.01)

(58) Field of Classification Search
    CPC .. G05D 1/0016; G05D 1/0202; G05D 1/0038; G05D 1/0858; G01S 19/52
    See application file for complete search history.

(56) References Cited

U.S. PATENT DOCUMENTS

2011/0301784 A1* 12/2011 Oakley .................. B64C 27/04
                                                    701/2
2012/0078451 A1    3/2012 Ohtomo et al.
2015/0379874 A1* 12/2015 Ubhi ..................... G01S 5/0027
                                                    701/3

FOREIGN PATENT DOCUMENTS

| EP | 2 433 867 A2 | | 3/2012 |
|---|---|---|---|
| JP | 10-337145 A | | 12/1998 |
| JP | 2000-118498 A | | 4/2000 |
| JP | 2001-037397 A | | 2/2001 |
| JP | 2001037397 A | * | 2/2001 |
| JP | 2001-325245 A | | 11/2001 |
| JP | 2002-211494 A | | 7/2002 |
| JP | 2004-305805 A | | 11/2004 |
| JP | 2004305805 A | * | 11/2004 |
| JP | 2004-359002 A | | 12/2004 |
| JP | 2004359002 A | * | 12/2004 |
| JP | 2006-121997 A | | 5/2006 |
| JP | 2007-248173 A | | 9/2007 |
| JP | 2008-068709 A | | 3/2008 |
| JP | 2008-092818 A | | 4/2008 |
| JP | 2012-071645 A | | 4/2012 |
| JP | 4948098 B2 | | 6/2012 |
| JP | 2014-113864 A | | 6/2014 |
| WO | 00/73727 A1 | | 12/2000 |

OTHER PUBLICATIONS

English translation of Official Communication issued in corresponding International Application PCT/JP2015/065432, dated Feb. 21, 2017.

* cited by examiner

F I G. 3
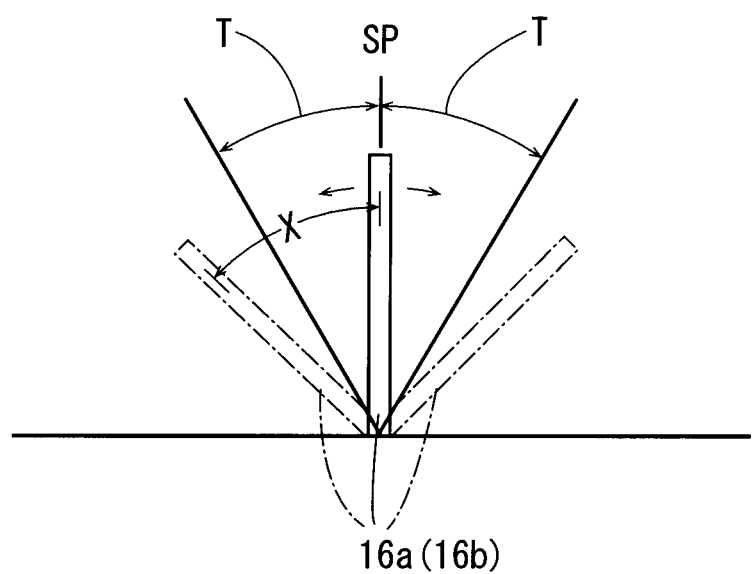

REMOTE CONTROL DEVICE

BACKGROUND OF THE INVENTION

1. Field of the Invention

The present invention relates to remote control devices, and more specifically to a remote control device of an unmanned helicopter.

2. Description of the Related Art

An example of a conventional technique in this field is disclosed in JP-A 2002-211494. JP-A 2002-211494 discloses a flight planning apparatus which makes it possible to set flight area data by moving on an outer circumference of a planned flight area with a GPS receiver connected therewith and registering absolute positions (positions expressed by longitude and latitude) and altitudes provided by the GPS receiver at each end point of the flight area.

However, according to the above-described flight planning apparatus, it is necessary to register absolute positions and altitudes provided by the GPS receiver at every end point of the flight area while moving along an outer circumference of the flight area, and this must be done for each flight area, so cumbersome steps are required for the preparation and setting of the flight area data before the flight.

SUMMARY OF THE INVENTION

Preferred embodiments of the present invention provide a remote control device that enables a desired flight of an unmanned helicopter without requiring cumbersome steps to prepare and set the flight area data before the flight regardless of the topography of the flight area.

According to a preferred embodiment of the present invention, a remote control device for an unmanned helicopter includes an orientation detector which detects a flight orientation of the unmanned helicopter; a speed information detector which detects speed information of the unmanned helicopter; a distance detector which detects a flight distance of the unmanned helicopter by integrating the speed information; a storage which stores information about the unmanned helicopter concerning an updatable base point; a position detector which detects a relative position that indicates a position of the unmanned helicopter with respect to the base point based on the flight orientation of the unmanned helicopter and the flight distance of the unmanned helicopter obtained by integrating the speed information; and a controller configured or programmed to control a flight of the unmanned helicopter based on the relative position.

In a preferred embodiment of the present invention, regardless of the topography of the flight area, a relative position, which indicates a position of the unmanned helicopter with respect to the base point, is determined based on the flight orientation of the unmanned helicopter and the flight distance of the unmanned helicopter which is obtained by integrating the speed information, and the unmanned helicopter performs its flight based on the relative position. Therefore, even in a case where a series of flights must be made over areas having different topography, it is not necessary to spend time for the cumbersome preparation and setting of the flight area data before the flight, and the task is performed easily and flexibly. In other words, the unmanned helicopter does not require cumbersome steps in the preparation before the flight regardless of topography of the flight area, and enables a desired flight.

Preferably, the controller is configured or programmed to cause the storage to store the flight orientation of the unmanned helicopter at a time point during the flight of the unmanned helicopter as the information concerning the base point; set a flight path for the unmanned helicopter to fly based on the flight orientation at the base point; and control the flight of the unmanned helicopter so that the relative position is along the flight path. In this case, a position of the unmanned helicopter at one time point during the flight is taken as a base point; a flight path for the unmanned helicopter to fly is set based on a flight orientation of the unmanned helicopter at the base point; and the unmanned helicopter performs its flight so that its relative position is along the flight path. Therefore, it is not necessary to set a flight path(s) in advance. The operator simply sets an appropriate position as the base point while watching the unmanned helicopter in flight, and then, it is possible to fly the unmanned helicopter along the flight path.

Further preferably, the remote control device further includes an instruction processor which provides an instruction to start Turn Assist of the unmanned helicopter as a flight mode in which a traveling direction is automatically changed. With this arrangement, in order to fly the unmanned helicopter along the flight path including a first outgoing path, a return path, and a first U-turn path which connects an end point of the first outgoing path and a start point of the return path with each other, the controller is configured or programmed to cause the storage to store a position and a flight orientation of the unmanned helicopter at a time point when the instruction processor provides the instruction to start Turn Assist, as the information concerning the base point; cause the unmanned helicopter to fly along the flight orientation at the base point in the first outgoing path; cause the unmanned helicopter to move from the end point of the first outgoing path to the start point of the return path by determining the start point of the return path based on the flight orientation of the unmanned helicopter at the base point or in the first outgoing path and first space information which indicates a space between the first outgoing path and the return path, in the first U-turn path; and cause the unmanned helicopter to fly in a reverse direction from the flight orientation at the base point or in the first outgoing path, in the return path. In this case, when flying the unmanned helicopter along a flight path which includes the first outgoing path, the return path, and the first U-turn path connecting the two paths with each other, the position of the unmanned helicopter at a time point when the instruction processor provides an instruction to start Turn Assist is set as the base point; in the first outgoing path, the unmanned helicopter is flown along the flight orientation at the base point; in the first U-turn path, the start point of the return path is determined based on the flight orientation of the unmanned helicopter at the base point or in the first outgoing path and the first space information to move the unmanned helicopter from the end point of the first outgoing path to the start point of the return path; and in the return path, the unmanned helicopter is flown in the reverse direction from the flight orientation at the base point or in the first outgoing path. Therefore, by providing the instruction to start Turn Assist with the instruction processor, it is possible to easily make the unmanned helicopter perform a round trip so that the first outgoing path and the return path are parallel or substantially parallel to each other with the space indicated by the first space information.

Further, preferably, the controller is configured or programmed to cause the unmanned helicopter to move from the end point of the first outgoing path to the start point of the return path by determining the start point of the return path based on the flight orientation of the unmanned helicopter at the end point of the first outgoing path and the first space information, in the first U-turn path and cause the unmanned helicopter to fly in a reverse direction from the flight orientation at the end point of the first outgoing path, in the return path. In this case, in the first U-turn path and the return path, the unmanned helicopter is flown based on the most recent flight orientation at the end point of the first outgoing path. Therefore, it is possible to fly the unmanned helicopter so that the first outgoing path and the return path are more parallel or substantially parallel to each other.

Preferably, the flight path further includes a second outgoing path and a second U-turn path which connects an end point of the return path and a start point of the second outgoing path with each other. With this arrangement, the controller is configured or programmed to cause the unmanned helicopter to move from the end point of the return path to the start point of the second outgoing path by determining the start point of the second outgoing path based on the flight orientation of the unmanned helicopter at the base point, in the first outgoing path or in the return path and second space information which indicates a space between the return path and the second outgoing path, in the second U-turn path; and cause the unmanned helicopter to fly along the flight orientation at the base point or in the first outgoing path, or cause the unmanned helicopter to fly in a reverse direction from the flight orientation in the return path, in the second outgoing path. In this case, it is possible to easily make the flight conform to a given flight area by repeating the flight pattern from the first outgoing path to the second outgoing path as needed.

Further preferably, the controller is configured or programmed to cause the unmanned helicopter to move from the end point of the return path to the start point of the second outgoing path by determining the start point of the second outgoing path based on the flight orientation of the unmanned helicopter at the end point of the return path and the second space information, in the second U-turn path; and cause the unmanned helicopter to fly in a reverse direction from the flight orientation at the end point of the return path, in the second outgoing path. In this case, in the second U-turn path and the second outgoing path, the unmanned helicopter is flown based on the most recent flight orientation at the end point of the return path. Therefore, it is possible to fly the unmanned helicopter so that the return path and the second outgoing path are more parallel or substantially parallel to each other.

Further, preferably, the remote control device further includes an end point instruction processor which provides instructions of the end point of the first outgoing path and of the end point of the return path. With this arrangement, the controller is configured or programmed to determine the start point of the return path based on the flight orientation of the unmanned helicopter at the end point of the first outgoing path indicated in the instruction by the end point instruction processor and the first space information, and determine the start point of the second outgoing path based on the flight orientation of the unmanned helicopter at the end point of the return path indicated in the instruction by the end point instruction processor and the second space information. In this case, it is possible to provide instructions of the end point of the first outgoing path and of the end point of the return path by the end point instruction processor, and therefore, it is possible to freely set the distance from the start point of the first outgoing path to the end point thereof, and the distance from the start point of the return path to the end point thereof. In other words, it is possible to set the timing for the U-turn of the unmanned helicopter with the instruction from the human operator. Therefore, it is possible to easily adapt the flight to various topographic differences (depth of the site) in the flight area.

Preferably, the unmanned helicopter is used to spray a spray material, and the remote control device further includes a spray instruction processor to provide instructions to start and terminate spraying of the spray material. With this arrangement, the spray instruction processor functions also as the end point instruction processor; the controller is configured or programmed to start the spraying of the spray material in response to the instruction to start the spraying from the spray instruction processor; and terminate the spraying of the spray material and determine the start point of the return path and the start point of the second outgoing path in response to the instruction to terminate the spraying from the spray instruction processor. In this case, there is no need to provide a separate end point instruction processor other than the spray instruction processor since the spray instruction processor functions also as the end point instruction processor. Further, spraying of the spray material from the unmanned helicopter is started in response to the instruction to start the spraying from the spray instruction processor, and the spraying of the spray material from the unmanned helicopter is terminated in response to the instruction to terminate the spraying from the spray instruction processor. Therefore, it is not necessary to store a spray distance in advance; rather, the operator is able to flexibly start/stop the spraying with his/her own instruction at appropriate positions while watching the position of the unmanned helicopter in flight.

Further preferably, the controller is configured or programmed to determine the start point of the first outgoing path triggered by the instruction to start Turn Assist from the instruction processor; determine the end point of the first outgoing path based on the start point of the first outgoing path and distance information which is set in advance; and determine the start point of the return path based on the flight orientation of the unmanned helicopter at the end point of the first outgoing path and the first space information; and further, the controller is configured or programmed to determine the end point of the return path based on the start point of the return path and the distance information which is set in advance; determine the start point of the second outgoing path based on the flight orientation of the unmanned helicopter at the end point of the return path and the second space information; and determine the end point of the second outgoing path based on the start point of the second outgoing path and the distance information which is set in advance. In this case, by providing the instruction to start Turn Assist using the instruction processor, it is possible, thereafter, to automatically fly the unmanned helicopter.

Further, preferably, the unmanned helicopter is used to spray a spray material, and the controller is configured or programmed to start spraying of the spray material at each start point of the first outgoing path, the return path, and the second outgoing path; and terminate the spraying of the spray material at each end point of the first outgoing path, the return path, and the second outgoing path. In this case, the operator does not have to provide instructions to start or terminate the spraying since starting and terminating of the spraying of the spray material are performed automatically.

Preferably, the remote control device further includes an end point instruction processor which provides an instruction of the end point of the first outgoing path. With this arrangement, the controller is configured or programmed to determine the start point of the first outgoing path triggered by the instruction to start Turn Assist from the instruction processor; determine distance information based on the start point of the first outgoing path and the end point of the first outgoing path indicated in the instruction by the end point instruction processor; and determine the start point of the return path based on the flight orientation of the unmanned helicopter at the end point of the first outgoing path and the first space information; and further, the controller is configured or programmed to determine the end point of the return path based on the start point of the return path and the determined distance information; determine the start point of the second outgoing path based on the flight orientation of the unmanned helicopter at the end point of the return path and the second space information; and determine the end point of the second outgoing path based on the start point of the second outgoing path and the determined distance information. In this case, by indicating the end point of the first outgoing path using the end point instruction processor, it is possible to set (change) the distance from the start point of the first outgoing path to the end point thereof, the distance from the start point of the return path to the end point thereof, and the distance from the start point of the second outgoing path to the end point thereof, namely, the timings for the U-turns of the unmanned helicopter. Therefore, it is possible to easily adapt the flight to various topographic differences (depth of the site) in the flight area.

Further preferably, the unmanned helicopter is used to spray a spray material, and the controller is configured or programmed to start spraying of the spray material at each start point of the first outgoing path, the return path, and the second outgoing path; and terminate the spraying of the spray material at each end point of the first outgoing path, the return path, and the second outgoing path. Here, for example, in an incomplete full-automatic flight mode which will be described below, when the end point of the first outgoing path is indicated by the end point instruction processor, distance information is determined, and based on the distance information, the end point of the return path and the end point of the second outgoing path are also determined. Therefore, the distance for which the spray material is sprayed (spray stop timing) in the first outgoing path, the return path and the second outgoing path is easily set (changed) using the instructions from the operator.

Further, preferably, the first outgoing path and the second outgoing path are on opposite sides from each other with respect to the return path, and the space between the first outgoing path and the return path is equal or substantially equal to the space between the return path and the second outgoing path. In this case, it is possible to easily make the unmanned helicopter perform a round trip so that the outgoing path and the return path are parallel or substantially parallel to each other with a substantially constant space in between.

Preferably, the remote control device further includes a steering device which steers the unmanned helicopter. With this arrangement, the controller is configured or programmed to adjust a flight state of the unmanned helicopter if an amount of operation of the steering device is within a threshold value, or terminate Turn Assist if the amount of operation of the steering device exceeds the threshold value after the instruction is given to start Turn Assist. In this case, the operator is able to make fine adjustments, during the flight along the flight path, on the flight state (flight route) while watching the unmanned helicopter, and the operator is able to terminate the flight along the flight path immediately and easily if the flight state is very much different from a desired one.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is an illustrative drawing for describing movement of a first joystick and a second joystick and a threshold value.

DETAILED DESCRIPTION OF THE PREFERRED EMBODIMENTS

Figure 1:
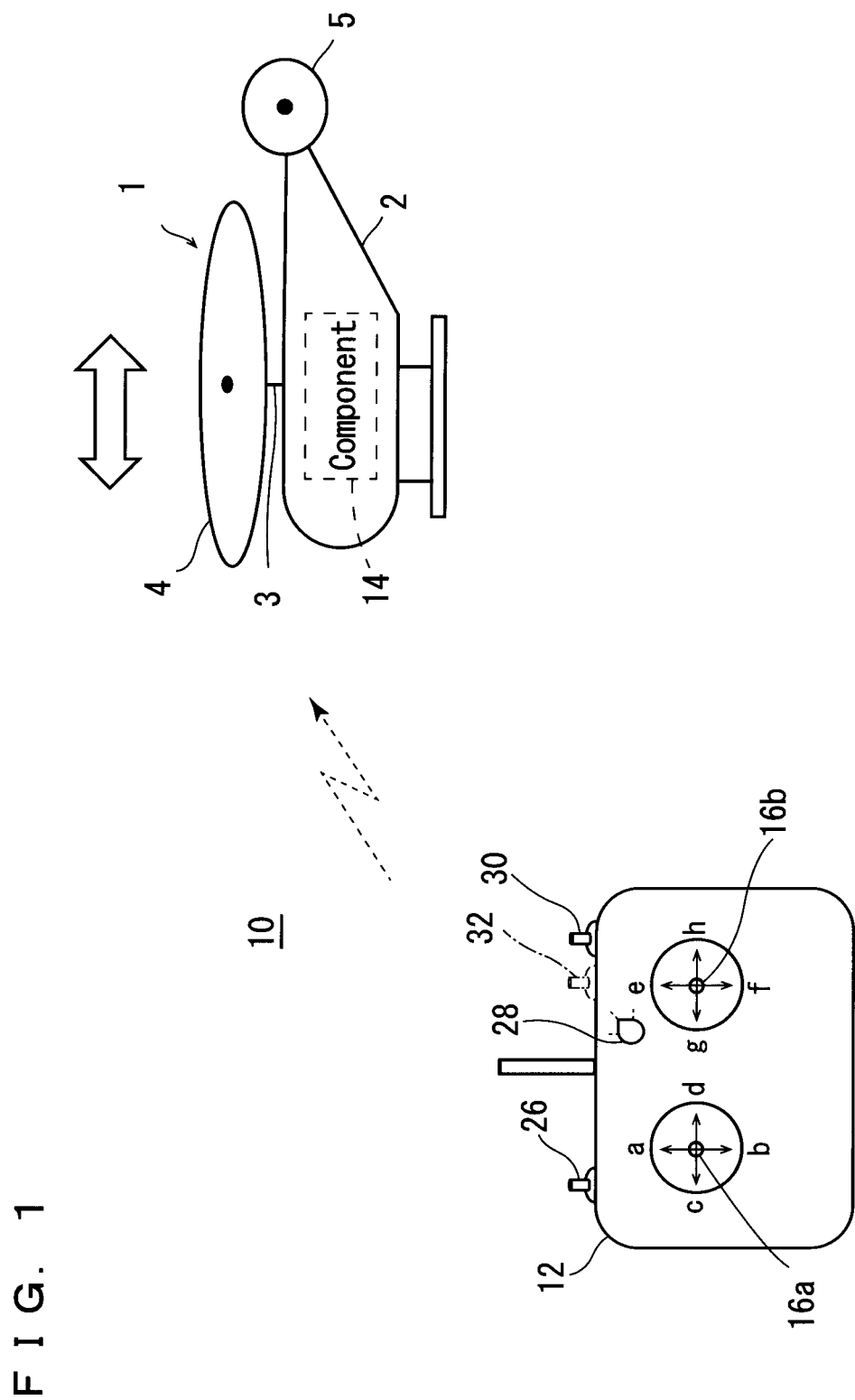
FIG. 1 is an illustrative drawing which shows a remote control device and an unmanned helicopter according to a preferred embodiment of the present invention.

Hereinafter, preferred embodiments of the present invention will be described with reference to the drawings. Referring to FIG. 1, a remote control device 10 according to a preferred embodiment of the present invention is a remote control device of an unmanned helicopter 1.

The unmanned helicopter 1 includes a body 2, a mast 3, a main rotor 4 and a tail rotor 5. The mast 3 protrudes upward from the body 2, and is rotatable. The mast 3 includes an upper end portion, where the main rotor 4 is fixed. The tail rotor 5 is rotatable, and is located at a rear end portion of the body 2. The main rotor 4 and the tail rotor 5 are rotated based on a driving force from an unillustrated drive source provided inside the body 2. Also, the unmanned helicopter 1 includes an unillustrated spray apparatus to spray a spray material such as a chemical agent.

The remote control device 10 includes a transmitter 12 which transmits signals toward the unmanned helicopter 1, and a helicopter component 14 which is installed in the unmanned helicopter 1.

Figure 2:
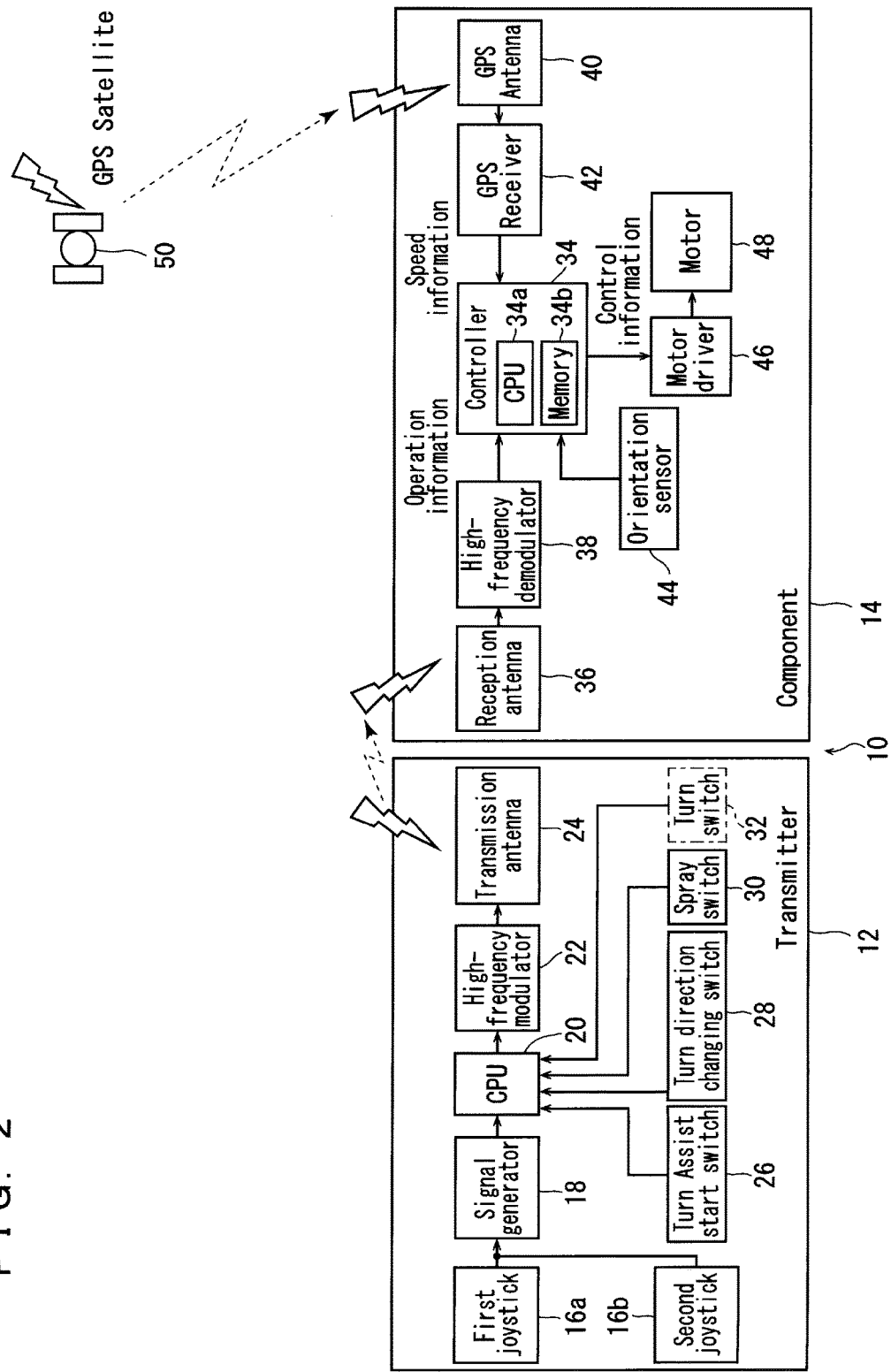
FIG. 2 is an electrical block diagram which shows a configuration example of the remote control device.

Referring to FIG. 2, the transmitter 12 includes a first joystick 16a, a second joystick 16b, a signal generator 18, a CPU 20, a high-frequency modulator 22, a transmission antenna 24, a Turn Assist start switch 26, a turn direction changing switch 28, and a spray switch 30.

Referring to FIG. 1, the first joystick 16a and the second joystick 16b represent the steering device that steers the unmanned helicopter 1. Operating the first joystick 16a in direction ab (fore-aft direction) controls a motor 48 (which will be described below), to change an angle of the nose in an up-down direction during the flight, such that the unmanned helicopter 1 accelerates or decelerates (moves forward or moves backward). Operating the first joystick 16a in the direction a moves down the nose to cause the unmanned helicopter 1 to accelerate (fly forward), whereas operating the first joystick 16a in the direction b moves up the nose to cause the unmanned helicopter 1 to decelerate (fly backward). Operating the first joystick 16a in direction cd (left-right direction) turns the nose in the left-right direction. Operating the second joystick 16b in direction of (fore-aft direction) causes the helicopter body to ascend or descend. Operating the second joystick 16b in direction gh (left-right direction) causes the helicopter body to tilt in the left-right direction.

Referring to FIG. 3, as described above, the first joystick 16a and the second joystick 16b are movable (tiltable) from a baseline position SP (neutral position), to forward, rearward, leftward and rightward. The helicopter component 14 includes a controller 34 (to be described below) which, after the Turn Assist start switch 26 of the transmitter 12 is turned ON such that an instruction to start Turn Assist is provided, is configured or programmed to adjust the flight state (flight route) of the unmanned helicopter 1 in accordance with an amount of operation (operation angle X) of the first joystick 16a and the second joystick 16b from the baseline position SP if the amount of operation is within a threshold value T, or terminate the Turn Assist if the amount of operation of the first joystick 16a and the second joystick 16b exceeds the threshold value T.

The signal generator 18 of the transmitter 12 generates analog operation information in accordance with the amount of operation of the first joystick 16a and/or the second joystick 16b from their baseline positions SP. The CPU 20 converts the analog operation information into digital operation information, and sends it to the high-frequency modulator 22.

The Turn Assist start switch 26 of the transmitter 12 represents the instruction processor which provides an instruction to start Turn Assist of the unmanned helicopter 1. Turn Assist refers to setting a flight mode in which a traveling direction is automatically changed. As examples of the flight modes in which the traveling direction is automatically changed, a semi-automatic flight mode, a complete full-automatic flight mode, and an incomplete full-automatic flight mode, for example, will be described below. Upon turning ON the Turn Assist start switch 26, an instruction to start Turn Assist is provided to the controller 34 of the helicopter component 14, whereupon a memory 34b (to be described below) of the controller 34 stores a nose orientation (direction in which the nose faces) or traveling orientation (direction in which movement is being made) of the unmanned helicopter 1 as the flight orientation, and the unmanned helicopter 1 starts to accelerate automatically in the flight orientation. Upon turning OFF the Turn Assist start switch 26, Turn Assist is coercively terminated; spraying of the spray material is terminated; and the unmanned helicopter 1 is brought to a hovering state.

The turn direction changing switch 28 is preferably a three-position (middle, right and left) switch. The middle position represents a mode in which no Turn Assist is provided, the right position represents a right turn mode, and the left position represents a left turn mode. If a switch is made from the right position or the left position to the middle position during Turn Assist, Turn Assist is terminated and the unmanned helicopter 1 is brought into a hovering state.

When the spray switch 30 is turned ON, spraying is started, whereas when the spray switch 30 is turned OFF, the spraying is stopped. The spray switch 30 is also able to function as a trigger to start a turn. In this case, when the spray switch 30 is turned OFF, spraying is stopped and then a turn is started.

The transmitter 12 may further include a turn switch 32. The turn switch 32 is used when performing the complete full-automatic flight mode or the incomplete full-automatic flight mode which will be described below. When the turn switch 32 is in the ON state, it is set to the complete full-automatic flight mode, whereas it is set to the incomplete full-automatic flight mode when it is in OFF state. Also, if the turn switch 32 is turned to ON from OFF, a U-turn is performed, whereas if it is turned OFF from ON, flying speed is decreased to a turn preparation speed (to a turn-position adjustment state).

Signals from these switches are supplied to the CPU 20. The CPU 20 converts the supplied signals to digital operation information and sends it to the high-frequency modulator 22.

In the high-frequency modulator 22, modulation is performed by using the digital operation information, and an obtained radio signal is transmitted from the transmission antenna 24.

The helicopter component 14 includes the controller 34, a reception antenna 36, a high-frequency demodulator 38, a GPS antenna 40, a GPS receiver 42, an orientation sensor 44, a motor driver 46, and the motor 48.

The radio signal which is sent from the transmission antenna 24 of the transmitter 12 is received by the reception antenna 36, and then demodulated by the high-frequency demodulator 38 into digital operation information which represents the amount of operation, and the information is supplied to the controller 34. Also, GPS signals relevant to the helicopter 1 from GPS satellites 50 are received by the GPS antenna 40 and supplied to the GPS receiver 42. In the GPS receiver 42, speed information which indicates a current speed of the unmanned helicopter 1 is extracted from the supplied GPS signals. The speed information is supplied to the controller 34. Also, the orientation sensor 44 detects a flight orientation of the unmanned helicopter 1. An orientation detection signal is supplied to the controller 34.

The controller 34 includes a CPU 34a and the memory 34b. The CPU 34a (controller 34) executes programs stored in the memory 34b, and provides instructions to various constituent elements to control the helicopter 1. For example, the CPU 34a (controller 34) generates control information based on the supplied operation information and speed information and controls the motor driver 46 so that the motor driver 46 drives the motor 48. Driving of the motor 48 changes the angle of the main rotor 4 to adjust the in-flight angle of the nose of the unmanned helicopter 1 in the up-down direction and so on, such that the flight state is controlled. Also, the CPU 34a (controller 34) integrates the supplied speed information to detect a flight distance of the unmanned helicopter 1. Further, the CPU 34a (controller 34) determines a relative position, which indicates a position of the unmanned helicopter 1 with respect to a base point, based on the flight orientation of the unmanned helicopter 1 and the flight distance of the unmanned helicopter 1 which is obtained through the integration of the speed information, and controls the flight of unmanned helicopter 1 based on the relative position. Specifically, flight orientations and flight distances are determined at certain time intervals from the base point; based on a flight orientation at the base point and a flight distance after the certain time interval from the base point, a relative position from the base point is determined; then based on a flight orientation at this relative position and a flight distance after the certain time interval from that relative position, a position achieved by the movement from that relative position is determined; and by sequentially adding the position which was moved from the relative position to the relative position from the base point at the certain time intervals, the relative position with respect to the base point is determined (updated). For example, in a case where the unmanned helicopter 1 is to be maintained at a constant flight altitude, two-dimensional coordinates may be assumed with the first base point represented by the point of origin (0, 0), the east-west direction represented by the X axis and the north-south direction represented by the Y axis, so that the flight orientation and the flight distance will provide the relative position in terms of coordinates (x, y). As another example, three-dimensional coordinates may be assumed with the first base point represented by the point of origin (0, 0, 0), the east-west direction represented by the X axis, the north-south direction represented by the Y axis, and the vertical direction represented by the Z axis, so that the flight orientation and the flight distance will provide the relative position in terms of coordinates (x, y, z). The memory 34*b* stores information etc. at an updatable base point of the unmanned helicopter 1.

Figure 4:
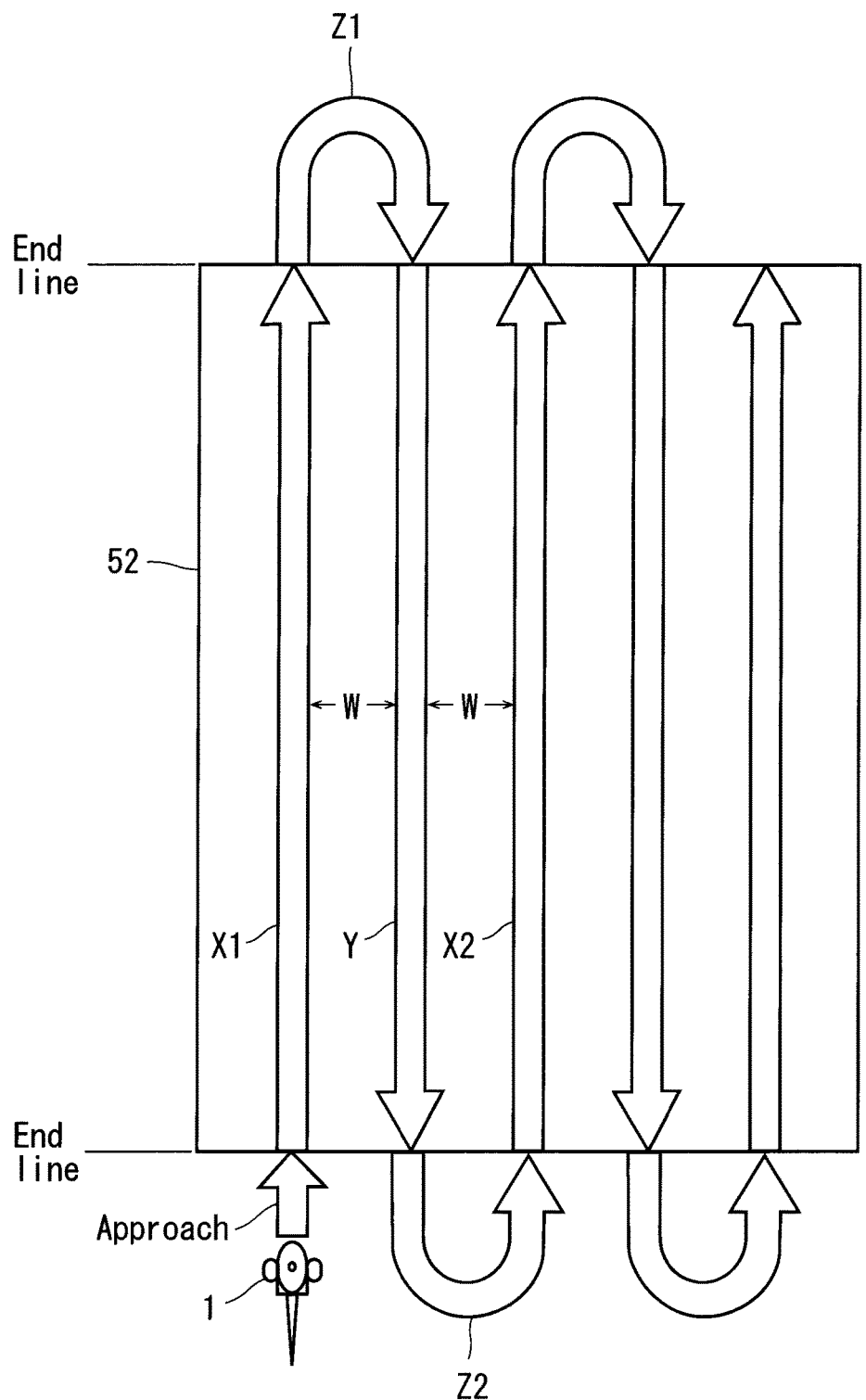
FIG. 4 is an illustrative drawing which outlines a flight mode of the unmanned helicopter.

Referring to FIG. 4, a flight mode of the unmanned helicopter 1 at a field 52 will be outlined. In this example, the field 52 is rectangular or substantially rectangular. In a flight path which will be described below, an end point of a first outgoing path X1 and a start point of a return path Y are connected with each other by a first U-turn path Z1; an end point of the return path Y and a start point of a second outgoing path X2 are connected with each other by a second U-turn path Z2; and thereafter, the same procedure is repeated. Between a mutually adjacent outgoing path and a return path, there is provided a constant or substantially constant space (spray width) W. Preferably, the space W is changeable as necessary. In each outgoing path and return path, the start point and the end point are set on a corresponding end line of the field 52. Therefore, typically, a chemical agent is sprayed from the start point to the end point of the outgoing path and the return path but no spraying of the chemical agent is made in the U-turn path.

First, in an approach, the unmanned helicopter 1 is flown straight forward in a direction in which it is to be flown straightly; once the start point of the first outgoing path X1 is reached, the unmanned helicopter 1 is flown straight forward from the start point to the end point of the first outgoing path X1 (from one of the end lines to the other of the end lines of the field 52) at a constant height while spraying the chemical agent. Next, the unmanned helicopter 1 is turned along the first U-turn path Z1, to the start point of the next spray target, i.e., the return path Y; the unmanned helicopter 1 is then flown straight forward from the start point to the end point of the return path Y at a constant height while spraying the chemical agent. Further, the unmanned helicopter 1 is turned along the second U-turn path Z2, to the start point of the next spray target, i.e., the second outgoing path X2; the unmanned helicopter 1 is then flown straight forward from the start point to the end point of the second outgoing path X2 at a constant height while spraying the chemical agent. Thereafter, the same sequence is repeated. It should be noted here that in the above-described example, the chemical agent was sprayed from the start point to the end point of each of the outgoing path and the return path (from end to end of the field 52). However, preferred embodiments of the present invention are not limited to this. For example, in the outgoing paths and/or the return paths, spraying of the chemical agent may be started at a farther inward point of the field 52 than the start point.

In the present preferred embodiment, the orientation sensor 44 corresponds to the orientation detector. The GPS antenna 40 and the GPS receiver 42 correspond to the speed information detector. The CPU 34*a* (controller 34) corresponds to the distance detector and the position detector. The memory 34*b* corresponds to the storage. The first joystick 16*a* and the second joystick 16*b* correspond to the steering device. The spray switch 30 corresponds to the spray instruction processor. In the semi-automatic flight mode, the spray switch 30 also functions as the end point instruction processor. In the incomplete full-automatic flight mode, the turn switch 32 also functions as the end point instruction processor. The distance W represents the first space information and the second space information.

Figure 5:
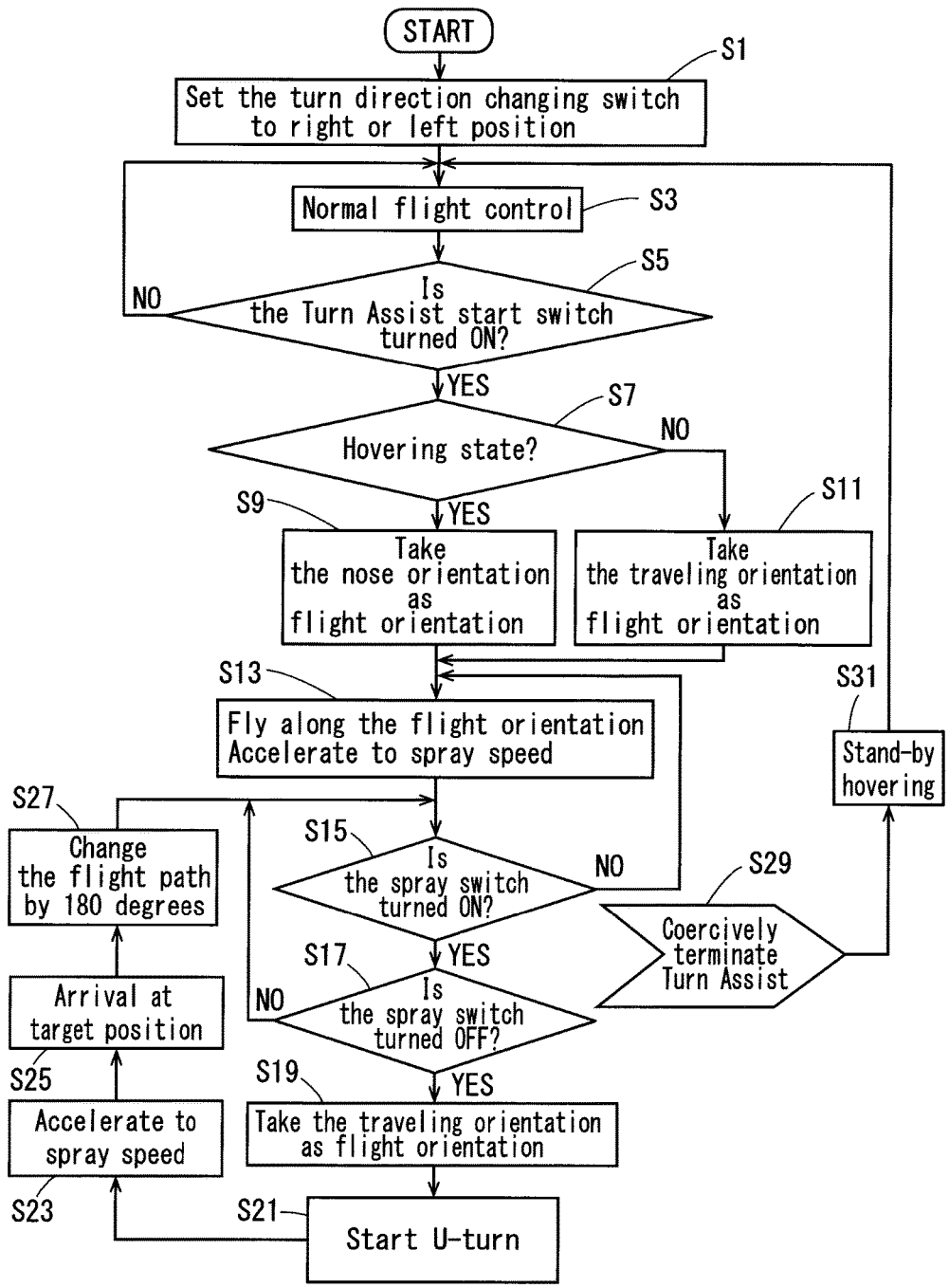
FIG. 5 is a flowchart which shows an example of semi-automatic flight mode.
Figure 6:
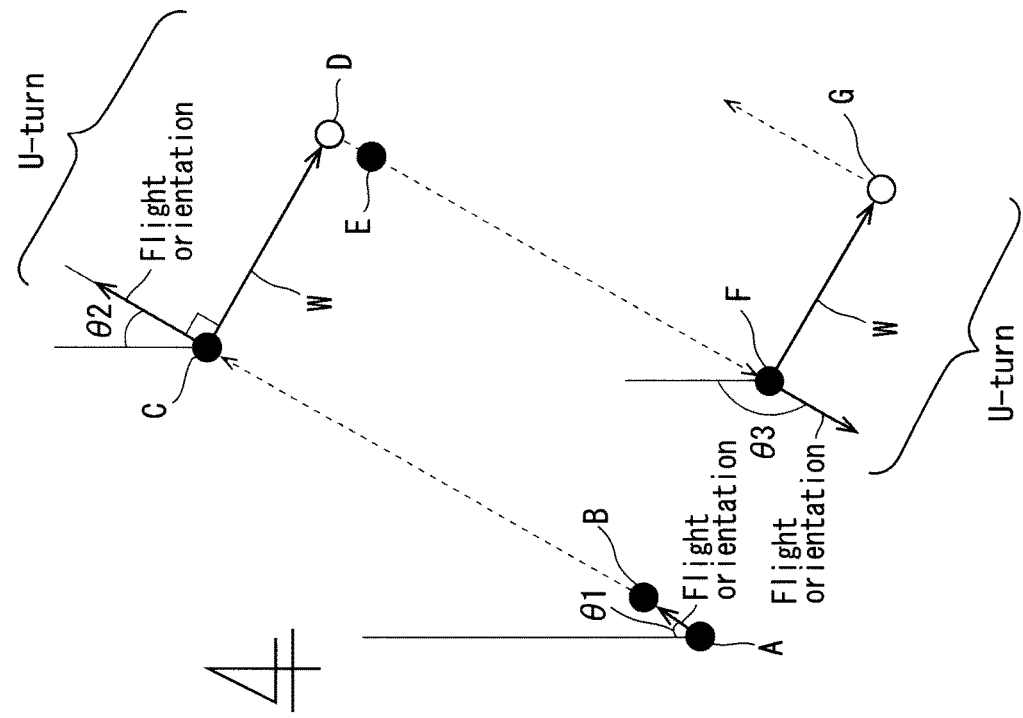
FIG. 6 is an illustrative drawing which outlines the semi-automatic flight mode.
Figure 7:
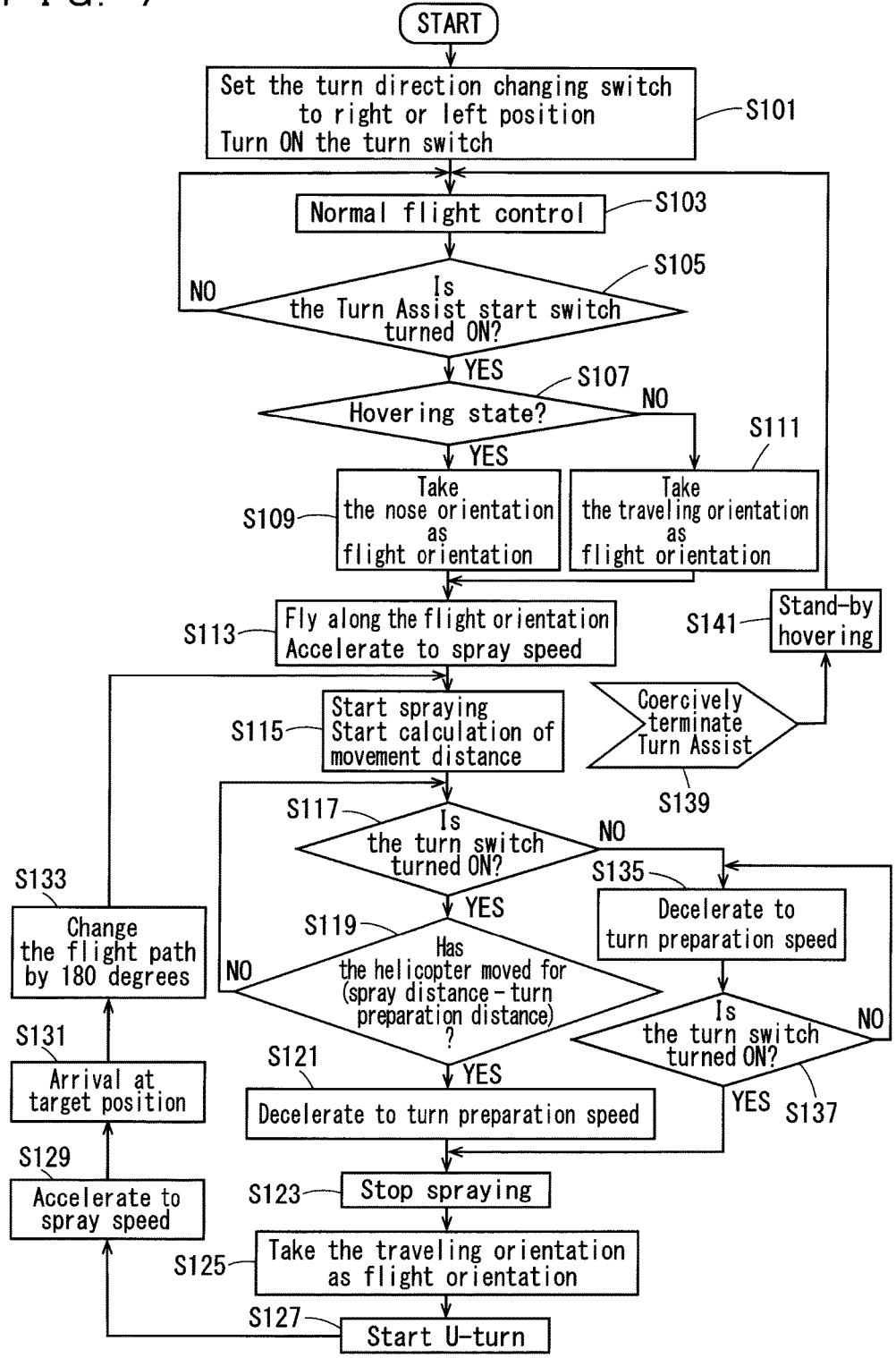
FIG. 7 is a flowchart which shows an example of complete full-automatic flight mode.

Next, referring to FIG. 4, FIG. 5 and FIG. 6, the description will cover an example of a semi-automatic flight mode of the unmanned helicopter 1. It should be noted here that FIG. 6, FIGS. 8A and 8B, and FIGS. 10A and 10B show black circles (●), each indicating a position of the unmanned helicopter 1 when the human operator made a switch in the operation of the unmanned helicopter 1.

First, the operator turns the turn direction changing switch 28 to the left position or the right position to set the direction for the U-turn of the unmanned helicopter 1 on the ground (Step S1). In the case shown in FIG. 6, the turn direction changing switch 28 is set to the right position. Next, the transmitter 12 is operated, such that the unmanned helicopter 1 takes off and normal flight control is performed (Step S3). In this process, the unmanned helicopter 1 is brought to a hovering state with the nose aligned with a direction in which the operator wants to make it spray, or is flown in a direction in which the spraying operation is planned; then the process waits for the operator to turn ON the Turn Assist start switch 26 (Step S5). If the Turn Assist start switch 26 is turned ON at Position A shown in FIG. 6, for example, the process determines whether or not the unmanned helicopter 1 is in a hovering state (Step S7). If the unmanned helicopter 1 is in a hovering state, Position A and the nose orientation as "flight orientation" are stored in the memory 34*b* (Step S9). On the other hand, if the unmanned helicopter 1 is moving, Position A and a traveling orientation as "flight orientation" are stored in the memory 34*b* (Step S11). In this way, Position A and "flight orientation" are stored in the memory 34*b* as information concerning the base point. In the present preferred embodiment, as shown in FIG. 6, the "flight orientation" is indicated as an angle with respect to the north as a reference; and an angle $\theta 1$ is stored in the memory 34*b* as "flight orientation" at the base point. Then, along the "flight orientation" and passing through Position A, a straight flight path (including an arrow with a broken line on the left side in FIG. 6 (the first outgoing path X1)) is set. The unmanned helicopter 1 flies along the "flight orientation" from Position A while automatically accelerating to a preset "spray speed" and reaches the "spray speed" (Step S13). Simultaneously, by using speed information (in terms of the up-down direction) from the GPS satellites 50, a control to maintain a flight altitude at this moment is started.

Then, a determination is made as to whether or not the operator has turned ON the spray switch 30 (Step S15). Until the operator turns ON the spray switch 30, the unmanned helicopter 1 maintains the flight at the "spray speed". Once the spray switch 30 is turned ON at Position B in FIG. 6, for example, spraying of the chemical agent from the unmanned helicopter 1 is started from Position B. Thereafter, determination is made as to whether or not the operator has turned OFF the spray switch 30 (Step S17). The spraying of the chemical agent is continued until the spray switch 30 is turned OFF. When the spray switch 30 is turned OFF at Position C in FIG. 6, for example, the spraying of the chemical agent is stopped, and Position C is taken as the end point of the first outgoing path X1. The flight of the unmanned helicopter 1 from Position B to Position C is controlled so that the relative position with respect to the base point (Position A) is along the flight path while constant "spray speed" and flight altitude are maintained. Further, when the spray switch 30 is turned OFF, a relative position at Position C (end point of the first outgoing path X1) with respect to the base point (Position A), and a traveling orientation at Position C as "flight orientation" are stored in the memory 34*b* (Step S19). As for "flight orientation", an angle θ2 is stored in the memory 34*b*. Therefore, Position C is the latest base point now. As described above, a relative position with respect to the most recent base point (Position A) and a "flight orientation" at Position C are overwritten in the memory 34*b* as the information concerning the base point. Then, a U-turn of the unmanned helicopter 1 is started in the turning direction which was set in Step S1 (Step S21).

In the U-turn in the first U-turn path Z1, automatic control is performed so that the unmanned helicopter 1 makes a turn without changing the nose direction, while making an arc toward Position D (start point of the return path Y) shown in FIG. 6 and completes acceleration to the "spray speed" by the time Position D is reached (Step S23). Herein, Position D is a target position which is spaced from Position C by a predetermined distance (space W) perpendicular or substantially perpendicular from the "flight orientation" at Position C. Once the unmanned helicopter 1 arrives at the target position, i.e., Position D (start point of the return path Y) (Step S25), a flight path from Position D (indicated by an arrow with a broken line in the middle of FIG. 6 (representing the return path Y)) is set to travel in the reverse direction, i.e., at an angle of 180 degrees from the "flight orientation" at Position C stored in the memory 34*b*; and automatic control is provided so that the flight of the unmanned helicopter 1 occurs along the given flight path. As described above, the flight path is changed by 180° (Step S27), and the process returns to Step S15.

In Step 15, if the spray switch 30 is turned ON at Position E shown in FIG. 6, for example, spraying of the chemical agent from the unmanned helicopter 1 is started at Position E. It should be noted here that the timing of spraying the chemical agent may be before reaching Position D or upon reaching Position D. Thereafter, determination is made as to whether or not the operator has turned OFF the spray switch 30 (Step S17). The spraying of the chemical agent is continued until the spray switch 30 is turned OFF. When the spray switch 30 is turned OFF at Position F in FIG. 6, for example, the spraying of the chemical agent is stopped, and Position F is the end point of the return path Y: a relative position at Position F (end point of the return path Y) with respect to the most recent base point (Position C), and a traveling orientation at Position F as "flight orientation" are stored in the memory 34*b* (Step S19). As for "flight orientation", an angle θ3 is stored in the memory 34*b*. Therefore, Position F is now the latest base point. As described above, a relative position at Position F with respect to the most recent base point (Position C) and a "flight orientation" are overwritten in the memory 34*b* as the information concerning the base point. Then, a U-turn of the unmanned helicopter 1 is started in the turning direction which was set in Step S1 (Step S21).

In the U-turn in the second U-turn path Z2, automatic control is performed so that the unmanned helicopter 1 makes a turn without changing the nose direction, while making an arc toward Position G (start point of the second outgoing path X2) shown in FIG. 6 and completes acceleration to the "spray speed" by the time Position G is reached (Step S23). Herein, Position G is a target position which is spaced from Position F by a predetermined distance (space W) perpendicular or substantially perpendicular from the "flight orientation" at Position F. Once the unmanned helicopter 1 arrives at the target position, i.e., Position G (start point of the second outgoing path X2) (Step S25), a flight path from Position G (indicated by an arrow with a broken line on the right side in FIG. 6) is set to travel in the reverse direction, i.e., at an angle of 180 degrees from the "flight orientation" at Position F stored in the memory 34*b*; and automatic control is provided so that the flight of the unmanned helicopter 1 occurs along the given flight path. As described above, the flight path is changed by 180° (Step S27), and the process returns to Step S15.

The above-described process from Step S15 through Step S27 is repeated as needed.

As an interruption to the process, the following is performed. When the operator turns OFF the Turn Assist start switch 26, the semi-automatic flight mode is coercively terminated (Step S29), the spraying of the chemical agent is stopped, the unmanned helicopter 1 is brought to a stand-by hovering state (Step S31), and the process returns to Step S3.

According to the remote control device 10 which functions as described above, regardless of the topography of the flight area, the unmanned helicopter 1 performs its flight based on a relative position, which indicates a position of the unmanned helicopter 1 with respect to the base point, that is determined based on the flight orientation of the unmanned helicopter 1 and the flight distance of the unmanned helicopter 1, which is obtained by integrating the speed information. Therefore, even in a case where a series of flights must be made over areas having different topography, it is not necessary to spend time for cumbersome preparation before the flight, and the task is performed easily and flexibly.

A position of the unmanned helicopter 1 at one time point during the flight of the unmanned helicopter 1 is taken as a base point; a flight path for the unmanned helicopter 1 to fly is set based on a flight orientation of the unmanned helicopter 1 at the base point; and the unmanned helicopter 1 makes its flight so that its relative position is along the flight path. Therefore, it is not necessary to set a flight path(s) in advance. The operator simply sets an appropriate position as the base point while watching the unmanned helicopter 1 in flight, and then, it is possible to fly the unmanned helicopter 1 along the flight path.

When flying the unmanned helicopter 1 along a flight path which includes the first outgoing path X1, the return path Y and the first U-turn path Z1 connecting the two paths with each other, a position of the unmanned helicopter 1 at a time point when the Turn Assist start switch 26 is used to provide an instruction to start Turn Assist is set as the base point; in the first outgoing path X1, the unmanned helicopter 1 is flown along the flight orientation at the base point; in the first U-turn path Z1, the start point of the return path Y is determined based on the flight orientation of the unmanned helicopter 1 at the end point of the first outgoing path X1 and the space W to move the unmanned helicopter 1 from the end point of the first outgoing path X1 to the start point of the return path Y; and in the return path Y, the unmanned helicopter 1 is flown in the reverse direction from the flight orientation at the end point of the first outgoing path X1. Therefore, by providing the instruction to start Turn Assist with the Turn Assist start switch 26, it is possible to easily make the unmanned helicopter 1 perform a round trip so that the first outgoing path X1 and the return path Y are parallel or substantially parallel to each other with the space W in between. Also, in the first U-turn path Z1 and the return path Y, the unmanned helicopter 1 is flown based on the most recent flight orientation at the end point of the first outgoing path X1; therefore, it is possible to fly the unmanned helicopter 1 so that the first outgoing path X1 and the return path Y are more parallel or substantially parallel to each other.

In the second U-turn path Z2, the start point of the second outgoing path X2 is determined based on the flight orientation of the unmanned helicopter 1 at the end point of the return path Y and the space W, such that the unmanned helicopter 1 is moved from the end point of the return path Y to the start point of the second outgoing path X2. In the second outgoing path X2, the unmanned helicopter 1 is flown in the reverse direction from the flight orientation at the end point of the return path Y. Therefore, it is possible to easily make the flight conform to a given flight area by repeating the flight pattern from the first outgoing path X1 to the second outgoing path X2 as needed. Also, in the second U-turn path Z2 and the second outgoing path X2, the unmanned helicopter 1 is flown based on the flight orientation at the end point of the return path Y; therefore, it is possible to fly the unmanned helicopter 1 so that the return path Y and the second outgoing path X2 are more parallel or substantially parallel to each other.

The first outgoing path X1 and the second outgoing path X2 are on opposite sides from each other with respect to the return path Y, and the space W between the first outgoing path X1 and the return path Y is equal or substantially equal to the space W between the return path Y and the second outgoing path X2. Therefore, it is possible to easily make the unmanned helicopter 1 perform round trips so that the outgoing path and the return path Y are parallel or substantially parallel to each other with a constant or substantially constant space in between.

After the instruction is provided to start Turn Assist, the flight state of the unmanned helicopter 1 is adjusted if the operated amounts of the first joystick 16a and the second joystick 16b are within a threshold value T, whereas Turn Assist is terminated if the operated amount of the first joystick 16a or the second joystick 16b exceeds the threshold value T. This allows the operator, during the flight along the flight path, to make fine adjustments to the flight state (flight route) while watching the unmanned helicopter 1, and the operator is able to terminate the flight along the flight path immediately and easily if the flight state is very much different from a desired one.

Also, an operator of any skill level is able to satisfactorily spray the chemical agent in the field 52. This improves the spraying quality and the spraying efficiency. Particularly when spraying chemical agents to tall crops (pine trees, sugar cane, dent corn, etc.) over a predetermined area from a specified high altitude, it is extremely difficult to exactly repeat a movement flight of a spray width at the specified high altitude. However, the Turn Assist function improves spraying quality/spraying efficiency, leading to increased operability.

Further, from GPS signals, speed information which indicates a current speed of the unmanned helicopter 1 is extracted, and the speed information is integrated to obtain a flight distance. Based on the flight distance and the flight orientation, a relative position which indicates a position of the unmanned helicopter 1 with respect to the base point is determined. This provides more accurate position information than position information obtained directly from the GPS signals.

The above-described functions and advantages are provided not only in semi-automatic flight mode but also in complete full-automatic flight mode and incomplete full-automatic flight mode which will be described below.

Also, according to the semi-automatic flight mode, the start point of the return path Y is determined based on the flight orientation of the unmanned helicopter 1 at the end point of the first outgoing path X1 which was provided by the spray switch 30 that functions also as the end point instruction processor, and on the space W; and the start point of the second outgoing path X2 is determined based on the flight orientation of the unmanned helicopter 1 at the end point of the return path Y provided by the spray switch 30, and on the space W. Thus, it is possible to provide instructions of the end point of the first outgoing path X1 and of the end point of the return path Y by using the spray switch 30, and therefore, it is possible to freely set the distance from the start point of the first outgoing path X1 to the end point thereof, and the distance from the start point of the return path Y to the end point thereof. In other words, it is possible to set the timing for the U-turn of the unmanned helicopter 1 with the instruction from the operator. Therefore, it is possible to easily adapt the flight to various topographic differences (depth of the site) in the flight area.

The spray switch 30 preferably functions as both the spray instruction processor and the end point instruction processor; spraying of the chemical agent is started in response to an instruction to start spraying from the spray switch 30 and the spraying of the chemical agent is terminated in response to an instruction to terminate the spraying from the spray switch 30, upon which the start point of the return path Y and the start point of the second outgoing path X2 are determined. Since the spray switch 30 functions also as the end point instruction processor as described above, there is no need to provide a separate end point instruction processor other than the spray switch 30. Further, in response to the instruction to start spraying from the spray switch 30, spraying of the chemical agent from the unmanned helicopter 1 is started, whereas in response to the instruction to terminate the spraying from the spray switch 30, the spraying of the chemical agent from the unmanned helicopter 1 is terminated. Therefore, it is not necessary to store a spray distance in advance; rather, the operator is able to flexibly start/stop the spraying with his/her own instruction at appropriate positions while watching the position of the unmanned helicopter 1 in flight. Further, since the operator is able to change the spray distance through his/her own operation, it is possible to handle various situations easily and flexibly even in cases where a chemical agent is sprayed in fields having different shapes.

Limits may be set in advance on the number of turns and/or a total transverse distance of movement (sum of spaces W), with an arrangement that the semi-automatic flight mode is automatically terminated and changed to the hovering state if the limit is exceeded. This prevents operation mistakes by the operator.

Next, Referring to FIG. 4, FIG. 7, and FIGS. 8A and 8B, description will be made of an example of a complete full-automatic flight mode of the unmanned helicopter 1.

First, the operator turns the turn direction changing switch 28 to the left position or the right position, thus determining the direction for the U-turn of the unmanned helicopter 1 on the ground, and turns ON the turn switch 32, thus selecting the complete full-automatic flight mode (Step S101). In the case shown in FIG. 8, the turn direction changing switch 28 is set to the right position. In the complete full-automatic flight mode, the "spray distance" (the distance from Position B to Position D, and the distance from Position E to Position G, in FIG. 8A) as the distance information and the number of turns are set in advance. It should be noted here that the "spray distance" and the number of turns may be set at this time point, or previous values may be used.

Next, the transmitter 12 is operated such that the unmanned helicopter 1 takes off and normal flight control is performed (Step S103). In this process, the unmanned helicopter 1 is brought to a hovering state with the nose aligned with a direction in which the operator wants to make it spray, or is flown in a direction in which the spraying operation is planned; then the process waits for the operator to turn ON the Turn Assist start switch 26 (Step S105). If the Turn Assist start switch 26 is turned ON at Position A shown in FIG. 8A, for example, the process determines whether or not the unmanned helicopter 1 is in a hovering state (Step S107). If the unmanned helicopter 1 is in a hovering state, Position A and the nose orientation as "flight orientation" are stored in the memory 34b (Step S109). On the other hand, if the unmanned helicopter 1 is moving, Position A and a traveling orientation as "flight orientation" are stored in the memory 34b (Step S111). In this way, Position A and "flight orientation" are stored in the memory 34b as information concerning a base point. An angle θ1 is stored in the memory 34b as "flight orientation" at the base point. Then, along the "flight orientation" and passing through Position A, a straight flight path (including an arrow with a broken line on the left side in FIG. 8A (the first outgoing path X1)) is set: Starting from Position A, the unmanned helicopter 1 flies along the "flight orientation" while automatically accelerating to a preset "spray speed" (>"turn preparation speed") (Step S113). Simultaneously, by using the speed information (in terms of the up-down direction) from the GPS satellites 50, control to maintain a flight altitude at this moment is started.

Figure 8A:
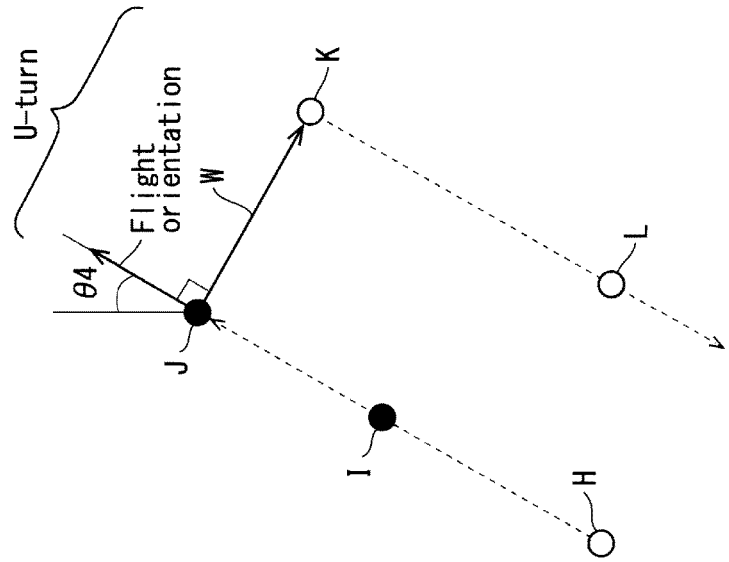
FIGS. 8A and 8B are illustrative drawings which outline the complete full-automatic flight mode.

Once the unmanned helicopter 1 achieves the "spray speed" at Position B shown in FIG. 8A, for example, the unmanned helicopter 1 automatically starts spraying of the chemical agent from Position B (start point of the first outgoing path X1), and calculates the distance moved from Position B on the fly (Step S115). Thereafter, determination is made as to whether or not the turn switch 32 is in the ON state (Step S117). Since the turn switch 32 was set to the ON state in Step S101, determination in the first outgoing path X1 is that the turn switch 32 is in the ON state, and the process goes to Step S119, which determines whether or not the unmanned helicopter 1 has moved from Position B by an amount (which is equal to the preset amount of spray distance minus a turn preparation distance). The turn preparation distance is set in advance. Until the unmanned helicopter 1 has moved by the amount (which is equal to the preset amount of spray distance minus the turn preparation distance), the flight at the "spray speed" is continued; once movement by the amount has been made, the unmanned helicopter 1 decelerates to the turn preparation speed to prepare for the U-turn (Step S121). As understood, deceleration to the turn preparation speed is performed without operation by the operator once the unmanned helicopter 1 has moved from Position B to Position C in FIG. 8A.

Then, when the unmanned helicopter 1 has moved from Position B by the preset amount of spray distance (from Position B to Position D in FIG. 8A), the spraying of the chemical agent is stopped (Step S123), and a relative position at Position D (end point of the first outgoing path X1) with respect to the base point (Position A), and a traveling orientation at Position D as "flight orientation" are stored in the memory 34b (Step S125). As for "flight orientation", an angle θ2 is stored in the memory 34b. Therefore, Position D is picked as the latest base point. As described above, a relative position with respect to the most recent base point (Position A) and a "flight orientation" at Position D are overwritten in the memory 34b as the information concerning the base point. Then, the U-turn of the unmanned helicopter 1 is started in the turning direction which was set in Step S101 (Step S127). As described, without any input from the operator, the spraying of the chemical agent is continued until Position D (end point of the first outgoing path X1) in FIG. 8A is reached and the U-turn is started.

The unmanned helicopter 1 makes the U-turn using the same procedure as has been described for the semi-automatic flight mode. Specifically, in the following U-turn in the first U-turn path Z1, automatic control is performed so that the unmanned helicopter 1 makes a turn without changing the nose direction, while making an arc toward Position E (start point of the return path Y) shown in FIG. 8A and completes acceleration to the "spray speed" by the time Position E is reached (Step S129). Herein, Position E is a target position which is spaced from Position D by a predetermined distance (space W) perpendicular or substantially perpendicular from the "flight orientation" at Position D. Once the unmanned helicopter 1 arrives at the target position, i.e., Position E (start point of Return Path Y) (Step S131), a flight path from Position E (indicated by an arrow with a broken line in the middle of FIG. 8A (representing Return Path Y)) is set to travel in the reverse direction, i.e., at an angle of 180 degrees from the "flight orientation" at Position D stored in the memory 34b; and automatic control is provided so that the flight of the unmanned helicopter 1 occurs along the given flight path. As described above, the flight path is changed by 180° (Step S133), and the process returns to Step S115.

In Step S115, the unmanned helicopter 1 automatically starts spraying of the chemical agent from Position E in FIG. 8A, and continues the flight while calculating the distance moved from Position E. Thereafter, determination is made as to whether or not the turn switch 32 is in the ON state (Step S117); if it is in the ON state, then determination is made as to whether or not the unmanned helicopter 1 has moved from Position E by the amount (which is equal to the preset amount of spray distance minus the turn preparation distance) (Step S119). Until the unmanned helicopter 1 has moved by the amount (which is equal to the preset amount of spray distance minus the turn preparation distance), the flight at the "spray speed" is continued; once movement by the amount of the distance has been made, deceleration to the turn preparation speed is performed to prepare for a U-turn (Step S121). As understood, deceleration to the turn preparation speed is performed without operation by the operator once the unmanned helicopter 1 has moved from Position E to Position F in FIG. 8A.

Then, when the unmanned helicopter 1 has moved from Position E by the preset amount of spray distance (from Position E to Position G in FIG. 8A), the spraying of the chemical agent is stopped (Step S123), and a relative position at Position G (end point of the return path Y) with respect to the most recent base point (Position D), and a traveling orientation at Position G as "flight orientation" are stored in the memory 34b (Step S125). As for "flight orientation", an angle θ3 is stored in the memory 34b. Therefore, Position G is picked as the latest base point. As described above, a relative position at Position G with respect to the most recent base point (Position D) and a "flight orientation" are overwritten in the memory 34*b* as the information concerning the base point. Then, a U-turn of the unmanned helicopter 1 is started in the turning direction which was set in Step S101 (Step S127). As described, without need for operation by the operator, the spraying of the chemical agent is continued until Position G (end point of the return path Y) in FIG. 8A is reached, and then the U-turn is started.

Thereafter, in the U-turn in the second U-turn path Z2, automatic control is performed so that the unmanned helicopter 1 makes a turn without changing the nose direction, while making an arc toward Position H (start point of the second outgoing path X2) in FIG. 8A and completes acceleration to the "spray speed" by the time Position H is reached (Step S129). Herein, Position H is a target position which is spaced by a predetermined distance (space W) from Position G perpendicular or substantially perpendicular from the "flight orientation" at Position G. Once the unmanned helicopter 1 arrives at the target position, i.e., Position H (start point of the second outgoing path X2) (Step S131), a flight path from Position H (indicated by an arrow with a broken line on the right side in FIG. 8A) is set to travel in the reverse direction, i.e., at an angle of 180 degrees from the "flight orientation" at Position G stored in the memory 34*b*; and automatic control is provided so that the flight of the unmanned helicopter 1 occurs along the given flight path. As described above, the flight path is changed by 180° (Step S133), and the process returns to Step S115. Thereafter, the same procedure as described above is performed to detect the end point of the second outgoing path X2.

In cases where the "spray distance" is not changed, the above-described process from Step S115 through Step S133 is repeated until "the number of turns" is reached.

On the other hand, if the "spray distance" is to be changed, the following operation is performed.

Figure 8B:
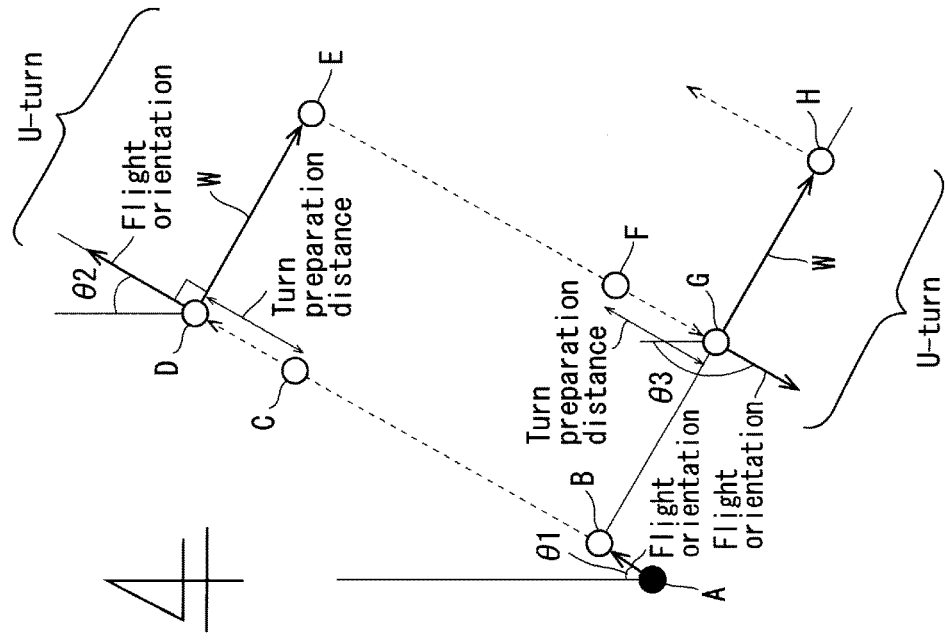
Figure 9:
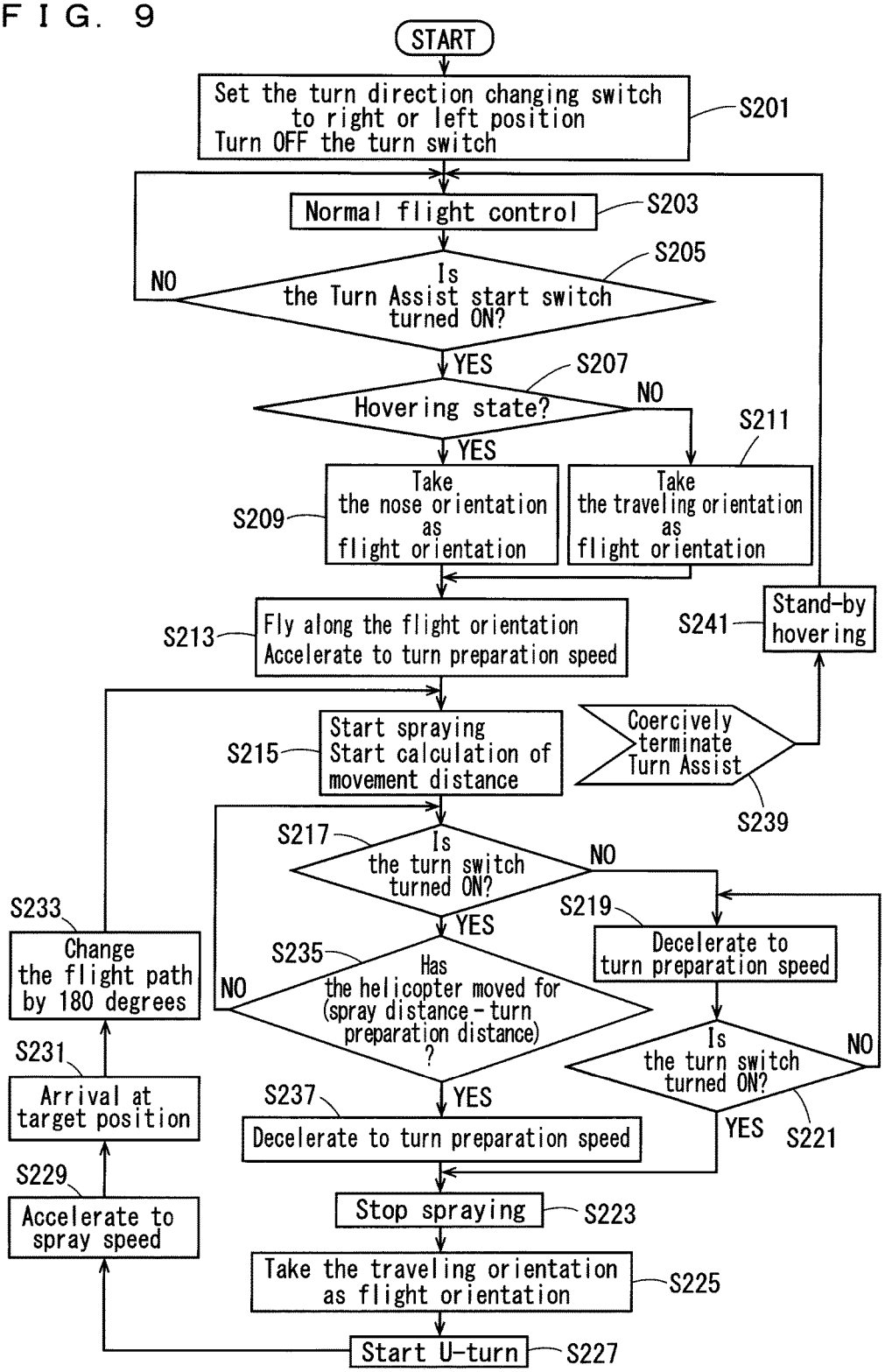
FIG. 9 is a flowchart which shows an example of incomplete full-automatic flight mode.

For example, referring to FIG. 8B, in a case where the "spray distance" is changed in the second outgoing path X2, if the turn switch 32 is turned OFF at Position I in Step S117; then deceleration is made to the turn preparation speed for U-turn preparation (Step S135). Thereafter, as far as the turn switch 32 is not turned back to the ON state (Step S137; NO), the unmanned helicopter 1 continues its flight at the turn preparation speed; and once the turn switch 32 is turned ON at Position J, (Step S137; YES), for example, the process goes to Step S123, and the spraying of the chemical agent is stopped. Then, Position J is picked as the end point of the second outgoing path X2; and a relative position at Position J (end point of the second outgoing path X2) with respect to the most recent base point (Position G), and a traveling orientation at Position J as "flight orientation" are stored in the memory 34*b* (Step S125). As for "flight orientation", an angle θ4 is stored in the memory 34*b*. Therefore, Position J is now the latest base point. As described above, a relative position at Position J with respect to the most recent base point (Position G) and a "flight orientation" are overwritten in the memory 34*b* as the information concerning the base point. Also, the changed "spray distance" (distance from Position H to Position J) is overwritten in the memory 34*b*. Then, a U-turn of the unmanned helicopter 1 is started in the turning direction which was set in Step S101 (Step S127). As described above, the "spray distance", i.e., turn position is adjusted.

Thereafter, the same process as described above is followed to obtain Position K, and when the unmanned helicopter 1 has moved to Position L, then deceleration to the turn preparation speed is performed.

Then, when the operator turns OFF the Turn Assist start switch 26 to interrupt the process, the complete full-automatic flight mode is coercively terminated (Step S139), the spraying of the chemical agent is terminated, the unmanned helicopter 1 is brought to a stand-by hovering state (Step S141), and the process returns to Step S103. Otherwise, the above-described process is repeated until the unmanned helicopter 1 has made the U-turns for "the number of turns", whereupon the spraying of the chemical agent is terminated, and the unmanned helicopter 1 is brought to a hovering state.

According to the remote control device 10 operated as described thus far, the Turn Assist start switch 26 provides an instruction to start Turn Assist as a trigger, whereupon the start point of the first outgoing path X1 is determined; the end point of the first outgoing path X1 is determined based on the start point of the first outgoing path X1 and a preset "spray distance"; and the start point of the return path Y is determined based on the flight orientation of the unmanned helicopter 1 at the end point of the first outgoing path X1 and the space W. Further, the end point of the return path Y is determined based on the start point of the return path Y and the "spray distance"; the start point of the second outgoing path X2 is determined based on the flight orientation of the unmanned helicopter 1 at the end point of the return path Y and the space W; and the end point of the second outgoing path X2 is determined based on the start point of the second outgoing path X2 and the "spray distance". Therefore, by providing the instruction to start Turn Assist using the Turn Assist start switch 26, it is possible, thereafter, to automatically fly the unmanned helicopter 1.

It is possible to start spraying of the chemical agent at each start point of the first outgoing path X1, the return path Y, and the second outgoing path X2, and to terminate the spraying of the chemical agent at each end point of the first outgoing path X1, the return path Y, and the second outgoing path X2. Since starting and terminating the spraying of the chemical agent are performed automatically, the operator does not have to provide instructions to start or terminate the spraying.

The operator is able to change start/stop timing of U-turns and spraying and the spray distance by operating the turn switch 32.

Since the operator is able to change the spray distance through his/her own operation, it is possible to handle situations easily and flexibly even in cases where a chemical agent is sprayed in fields having different shapes.

Limits may be set in advance on the number of turns and/or a total longitudinal or transverse distance of movement, with an arrangement that the complete full-automatic flight mode is automatically terminated and changed to the hovering state if the limit is exceeded. This prevents operation mistakes by the operator.

Further referring to FIG. 4, FIG. 9, and FIGS. 10A and 10B, description will be made of an example of an incomplete full-automatic flight mode of the unmanned helicopter 1.

First, the operator turns the turn direction changing switch 28, to the left position or the right position, thus determining the direction for the U-turn of the unmanned helicopter 1 on the ground, and turns OFF the turn switch 32, thus selecting incomplete full-automatic flight mode (Step S201). In the case shown in FIGS. 10A and 10B, the turn direction changing switch 28 is set to the right position. In incomplete full-automatic flight mode, the number of turns is set in advance. It should be noted here that the number of turns may be set at this time point, or a previous value may be used.

Next, the transmitter 12 is operated such that the unmanned helicopter 1 takes off and normal flight control is performed (Step S203). In this process, the unmanned helicopter 1 is brought to a hovering state with the nose aligned with a direction in which the operator wants to make it spray, or is flown in a direction in which the spraying operation is planned; then the process waits for the operator to turn ON the Turn Assist start switch 26 (Step S205). If the Turn Assist start switch 26 is turned ON at Position A shown in FIG. 10A, for example, the process determines whether or not the unmanned helicopter 1 is in a hovering state (Step S207). If the unmanned helicopter 1 is in a hovering state, Position A and the nose orientation as "flight orientation" are stored in the memory 34b (Step S209). On the other hand, if the unmanned helicopter 1 is moving, Position A and a traveling orientation as "flight orientation" are stored in the memory 34b (Step S211). In this way, Position A and "flight orientation" are stored in the memory 34b as information concerning a base point. An angle θ1 is stored in the memory 34b as "flight orientation" at the base point. Then, along the "flight orientation" and passing through Position A, a straight flight path (including an arrow with a broken line on the left side in FIG. 10A) (the first outgoing path X1)) is set. Starting from Position A, the unmanned helicopter 1 flies along the "flight path" while automatically accelerating to a preset "turn preparation speed" (<"spray speed") (Step S213). Simultaneously, by using the speed information (in terms of the up-down direction) from the GPS satellites 50, control to maintain a flight altitude at this moment is started. It should be noted here that the "turn preparation speed" is slower than the "spray speed" so as to allow quick response to a U-turn instruction and start a U-turn.

Figure 10B:
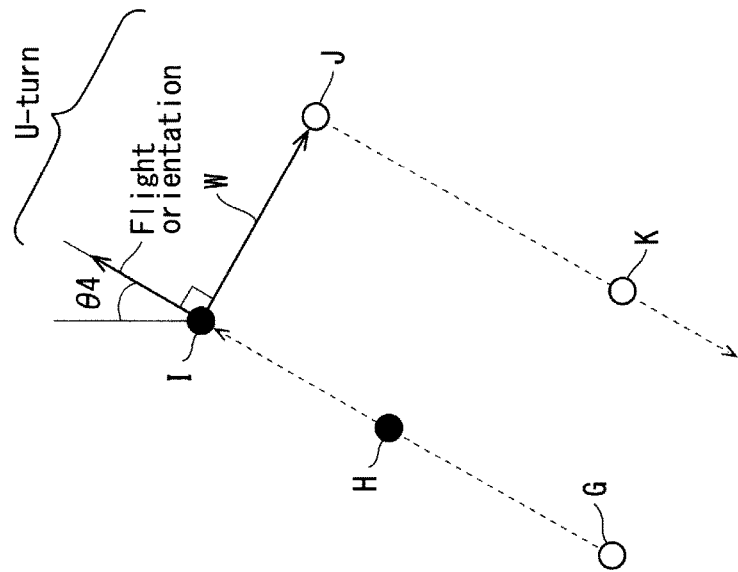
FIGS. 10A and 10B are illustrative drawings which outline the incomplete full-automatic flight mode.
Figure 10A:
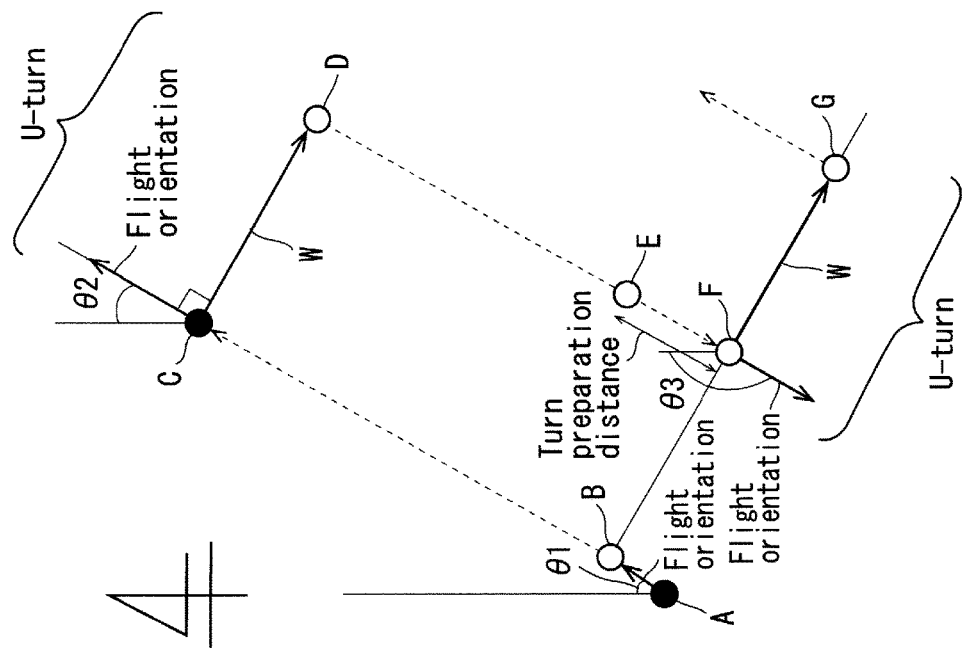

Once the unmanned helicopter 1 achieves the "turn preparation speed" at Position B shown in FIG. 10A, for example, the unmanned helicopter 1 automatically starts spraying of the chemical agent from the Position B (start point of the first outgoing path X1), and calculates the distance moved from Position B on the fly (Step S215). Thereafter, determination is made as to whether or not the turn switch 32 is in the ON state (Step S217). Since the turn switch 32 is set to the OFF state in Step S201, it is determined that the turn switch 32 is in the OFF state in the first outgoing path X1; the process goes to Step S219 and continues the flight at the turn preparation speed. The state is maintained unless the turn switch 32 is turned ON (Step S221; NO). When the turn switch 32 is turned ON at Position C in FIG. 10A, (Step S221; YES), for example, the spraying of the chemical agent is stopped (Step S223); Position C is picked as the end point of the first outgoing path X1; and a relative position at Position C (end point of the first outgoing path X1) with respect to the base point (Position A), and a traveling orientation at Position C as "flight orientation" are stored in the memory 34b (Step S225). As for "flight orientation", an angle θ2 is stored in the memory 34b. Therefore, Position C is picked as the latest base point. As described above, a relative position at Position C with respect to the most recent base point (Position A) and a "flight orientation" are overwritten in the memory 34b as the information concerning the base point. Then, a U-turn of the unmanned helicopter 1 is started in the turning direction which was set in Step S201 (Step S227). Also, a "spray distance" from Position B to Position C in FIG. 10A is stored in the memory 34b. The same procedure as has been described for the complete full-automatic flight mode is used for the U-turn and the flight thereafter of the unmanned helicopter 1.

Specifically, in the following U-turn in the first U-turn path Z1, automatic control is performed so that the unmanned helicopter 1 makes a turn without changing the nose direction, while making an arc toward Position D (start point of the return path Y) shown in FIG. 10A and achieves the "spray speed" by the time Position D is reached (Step S229). Herein, Position D is a target position which is spaced by a predetermined distance (space W) from Position C perpendicular or substantially perpendicular from the "flight orientation" at Position C. Once the unmanned helicopter 1 arrives at the target position, i.e., Position D (start point of Return Path Y) (Step S231), a flight path from Position D (indicated by an arrow with a middle broken line in FIG. 10A (representing Return Path Y)) is set to travel in the reverse direction, i.e., at an angle of 180 degrees from the "flight orientation" at Position C stored in the memory 34b; and automatic control is provided so that the flight of the unmanned helicopter 1 is performed along the given flight path. As described above, the flight path is changed by 180° (Step S233), and the process returns to Step S215.

In Step S215, the unmanned helicopter 1 automatically starts spraying of the chemical agent from Position D in FIG. 10A, and continues the flight while calculating the distance moved from Position D. Thereafter, determination is made as to whether or not the turn switch 32 is in the ON state (Step S217); if it is in the ON state, then determination is made as to whether or not the unmanned helicopter 1 has moved by an amount (which is equal to the stored amount of spray distance minus the turn preparation distance) from Position D (Step S235). Until the unmanned helicopter 1 has moved by the amount (which is equal to the stored amount of spray distance minus the turn preparation distance), the flight at the "spray speed" is continued; once movement by the amount has been made, deceleration to the turn preparation speed is performed to prepare for a U-turn (Step S237). As understood, deceleration to the turn preparation speed is performed once the unmanned helicopter 1 has moved from Position D to Position E in FIG. 10A.

Then, when the unmanned helicopter 1 has moved from Position D by the stored amount of spray distance (from Position D to Position F in FIG. 10A), the spraying of the chemical agent is stopped (Step S223), and a relative position at Position F (end point of the return path Y) with respect to the most recent base point (Position C), and a traveling direction at Position F as "flight orientation" are stored in the memory 34b (Step S225). As for "flight orientation", an angle θ3 is stored in the memory 34b. Therefore, Position F is picked as the latest base point. As described above, a relative position at Position F with respect to the most recent base point (Position C) and a "flight orientation" are overwritten in the memory 34b as the information concerning the base point. Then, a U-turn of the unmanned helicopter 1 is started in the turning direction which was set in Step S201 (Step S227). As described, once the turn switch 32 is turned ON in Step S221, the spraying of the chemical agent is continued from Position D (start point of the return path Y) to Position F (end point of the return path Y) in FIG. 10A, and then the U-turn is started without any input from the operator.

Thereafter, in the U-turn in the second U-turn path Z2, automatic control is performed so that the unmanned helicopter 1 makes a turn without changing the nose direction, while making an arc toward Position G (start point of the second outgoing path X2) in FIG. 10A and completes acceleration to the "spray speed" by the time Position G is reached (Step S229). Herein, Position G is a target position which is spaced by a predetermined distance (space W) from Position F perpendicular or substantially perpendicular from the "flight orientation" at Position F. Once the unmanned helicopter 1 arrives at the target position, i.e., Position G (start point of the second outgoing path X2) (Step S231), a flight path from Position G (indicated by an arrow with a broken line on the right side in FIG. 10A) is set to travel in the reverse direction, i.e., at an angle of 180 degrees from the "flight orientation" at Position F stored in the memory 34*b*; and automatic control is provided so that the flight of the unmanned helicopter 1 is performed along the given flight path. As described above, the flight path is changed by 180° (Step S233), and the process returns to Step S215. Thereafter, the same procedure as described above is performed to detect the end point of the second outgoing path X2.

In cases where the "spray distance" is not changed, the above-described process in Steps S215, S217, and S223 through S237 is repeated until "the number of turns" is reached.

On the other hand, if the "spray distance" is to be changed, the following operation is performed.

For example, referring to FIG. 10B, in a case where the "spray distance" is changed in the second outgoing path X2, if the turn switch 32 is turned OFF at Position H in Step S217; then deceleration is made to the turn preparation speed for U-turn preparation (Step S219). Thereafter, as far as the turn switch 32 is not turned back to the ON state (Step S221; NO), the unmanned helicopter 1 continues its flight at the turn preparation speed; and once the turn switch 32 is turned ON at Position I, (Step S221; YES), for example, the process goes to Step S223, and the spraying of the chemical agent is stopped. Then, Position I is picked as the end point of the second outgoing path X2; and a relative position at Position I (end point of the second outgoing path X2) with respect to the most recent base point (Position F), and a traveling orientation at Position I as "flight orientation" are stored in the memory 34*b* (Step S225). As for "flight orientation", an angle θ4 is stored in the memory 34*b*. Therefore, Position I is now the latest base point. As described above, a relative position at Position I with respect to the most recent base point (Position F) and a "flight orientation" are overwritten in the memory 34*b* as the information concerning the base point. Also, the changed "spray distance" (distance from Position G to Position I) is overwritten in the memory 34*b*. Then, a U-turn of the unmanned helicopter 1 is started in the turning direction which was set in Step S201 (Step S227). As described above, the "spray distance", i.e., turn position is adjusted.

Thereafter, the same process as described above is followed to obtain Position J, and when the unmanned helicopter 1 has moved to Position K, then deceleration to the turn preparation speed is performed.

Then, when the operator turns OFF the Turn Assist start switch 26 to interrupt the process, the incomplete full-automatic flight mode is coercively terminated (Step S239); the spraying of the chemical agent is terminated; the unmanned helicopter 1 is brought to a stand-by hovering state (Step S241); and the process returns to Step S203. Otherwise, the above-described process is repeated until the unmanned helicopter 1 has made a U-turn for "the number of turns", whereupon the spraying of the chemical agent is terminated, and the unmanned helicopter 1 is brought to a hovering state.

According to the remote control device 10 operated as described above, the Turn Assist start switch 26 provides an instruction to start Turn Assist, which triggers detection of the start point of the first outgoing path X1; the "spray distance" is determined based on the start point of the first outgoing path X1 and the end point of the first outgoing path X1 instructed by the turn switch 32; and the start point of the return path Y is determined based on the flight orientation of the unmanned helicopter 1 at the end point of the first outgoing path X1 and the space W. Further, the end point of the return path Y is determined based on the start point of the return path Y and the determined "spray distance"; the start point of the second outgoing path X2 is determined based on the flight orientation of the unmanned helicopter 1 at the end point of the return path Y and the space W; and the end point of the second outgoing path X2 is determined based on the start point of the second outgoing path X2 and the determined "spray distance". Thus, by indicating the end point of the first outgoing path X1 using the turn switch 32, it is possible to set (change) the distance from the start point of the first outgoing path X1 to the end point thereof, the distance from the start point of the return path Y to the end point thereof, and the distance from the start point of the second outgoing path X2 to the end point thereof, namely, timings for U-turns by the unmanned helicopter 1. Therefore, it is possible to easily adapt the flight to various topographic differences (depth of the site) in the flight area 52.

Spraying of the chemical agent is started at each start point of the first outgoing path X1, the return path Y, and the second outgoing path X2; and the spraying of the chemical agent is terminated at each end point of the first outgoing path X1, the return path Y, and the second outgoing path X2. Herein, when the end point of the first outgoing path X1 is indicated by the turn switch 32, the "spray distance" is determined, and based on the determined "spray distance", the end point of the return path Y and the end point of the second outgoing path X2 are also determined. Therefore, the distance for which the chemical agent is sprayed (spray stop timing) in the first outgoing path X1, the return path Y, and the second outgoing path X2 are easily set (changed) by instructions from the operator.

The operator is able to change start/stop timing of U-turn and spraying and the spray distance by operating the turn switch 32.

Since it is possible to set (change) the spray distance by operations from the operator, there is no need to store the spray distance in advance.

Limits may be set in advance on the number of turns and/or a total longitudinal or transverse distance of movement, with an arrangement that the incomplete full-automatic flight mode is automatically terminated and changed to the hovering state if the limit is exceeded. This prevents operation mistakes by the operator.

It should be noted here that in the preferred embodiments described above, the start point of the return path Y is preferably determined based on the flight orientation of the unmanned helicopter 1 at the end point of the first outgoing path X1 and the space W. However, preferred embodiments of the present invention are not limited to this. The start point of the return path Y may be determined based on the flight orientation of the unmanned helicopter 1 at the base point or any position in the first outgoing path X1 and the space W.

In the preferred embodiments described above, the start point of the second outgoing path X2 is preferably determined based on the flight orientation of the unmanned helicopter 1 at the end point of the return path Y and the space W. However, preferred embodiments of the present invention are not limited to this. The start point of the second outgoing path X2 may be determined based on the flight orientation of the unmanned helicopter 1 at the base points or any position in the first outgoing path X1 or the return path Y and the space W.

In the preferred embodiments described above, in the return path Y, the unmanned helicopter 1 is preferably flown in the reverse direction from the flight orientation at the end point of the first outgoing path X1. However, preferred embodiments of the present invention are not limited to this. In the return path Y, the unmanned helicopter 1 may be flown in the reverse direction from the flight orientation at the base point or any position in the first outgoing path X1.

In the preferred embodiments described above, in the second outgoing path X2, the unmanned helicopter 1 is preferably flown in the reverse direction from the flight orientation at the end point of the return path Y. However, preferred embodiments of the present invention are not limited to this. In the second outgoing path X2, the unmanned helicopter 1 may be flown along the flight orientation at the base point or any position in the first outgoing path X1, or the unmanned helicopter 1 may be flown in the reverse direction from the flight orientation at any position in the return path Y.

In the preferred embodiments described above, description was made for a case in which the spray instruction processor functions also as the end point instruction processor. However, preferred embodiments of the present invention are not limited to this. The spray instruction processor and the end point instruction processor may be separate elements from each other.

In the preferred embodiments described above, description was made for a case in which the first outgoing path X1 and the second outgoing path X2 are preferably on opposite sides from each other with respect to the return path Y. However, preferred embodiments of the present invention are not limited to this. The first outgoing path X1 and the second outgoing path X2 may be on the same side with respect to the return path Y. In this case, it is preferable that the space between the second outgoing path X2 and the return path Y is approximately two times or half of the space between the first outgoing path X1 and the return path Y.

Speed information of the unmanned helicopter 1 may be obtained from a speed sensor, a Pitot tube, etc. mounted on the unmanned helicopter 1. Also, speed information of the unmanned helicopter 1 may be obtained by integrating acceleration information from a gyro sensor mounted on the unmanned helicopter 1. In these cases, it is possible to obtain desired information without relying on the GPS satellites 50.

In the preferred embodiments described above, description was made for a case in which the unmanned helicopter 1 preferably moves to the target position without changing the nose direction when making a U-turn. However, preferred embodiments of the present invention are not limited to this. The unmanned helicopter 1 may change the nose direction by 180° when making a U-turn.

It is preferable that the spray speed is adjustable as needed.

In the preferred embodiments described above, the spray material preferably is a chemical agent. However, preferred embodiments of the present invention are not limited to this. The spray material may be fertilizers, seeds, etc.

In the preferred embodiments described above, the information concerning the base point is preferably updated, and based on the updated information concerning the base point, a relative position with respect to the base point is determined for a point (e.g. end point of the outgoing path or of the return path). However, preferred embodiments of the present invention are not limited to this. There may be an arrangement that the information concerning the first base point is not updated, and a relative position of a point with respect to the base point is determined based on the information concerning the first base point.

It should be noted here that the base point includes not only a base point as position information but also a base point as time information.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A control device for an unmanned helicopter, the control device comprising:
    an orientation detector that detects a flight orientation of the unmanned helicopter;
    a speed information detector that detects speed information of the unmanned helicopter;
    a distance detector that detects a flight distance of the unmanned helicopter by integrating the speed information;
    a storage that stores information about the unmanned helicopter concerning a base point;
    a position detector that detects a relative position that indicates a position of the unmanned helicopter with respect to a base point based on the flight orientation of the unmanned helicopter and the flight distance of the unmanned helicopter;
    a controller configured or programmed to control a flight of the unmanned helicopter based on the relative position; and
    a transmitter that transmits a signal to the controller to cause the storage to store the information concerning the base point in the storage; wherein
    the base point is a position of the unmanned helicopter at a time point during the flight of the unmanned helicopter; and
    the controller is configured or programmed to cause the storage to store the flight orientation of the unmanned helicopter at the time point during the flight of the unmanned helicopter as the information concerning the base point, to set a flight path for the unmanned helicopter to fly based on the flight orientation at the base point, and to control the flight of the unmanned helicopter so that the relative position is along the flight path.

2. The control device according to claim 1, further comprising an instruction processor that provides an instruction to start Turn Assist of the unmanned helicopter as a flight mode in which a traveling direction is automatically changed; wherein
    in order to fly the unmanned helicopter along the flight path including a first outgoing path, a return path, and a first U-turn path which connects an end point of the first outgoing path and a start point of the return path with each other, the controller is configured or programmed to:
    cause the storage to store a position and a flight orientation of the unmanned helicopter when the instruction processor provides the instruction to start Turn Assist, as the information concerning the base point;
    cause the unmanned helicopter to fly along the flight orientation at the base point in the first outgoing path;

cause the unmanned helicopter to move from the end point of the first outgoing path to the start point of the return path by determining the start point of the return path based on the flight orientation of the unmanned helicopter at the base point or in the first outgoing path and first space information which indicates a space between the first outgoing path and the return path in the first U-turn path; and cause the unmanned helicopter to fly in a reverse direction from the flight orientation at the base point or in the first outgoing path in the return path.

3. The control device according to claim 2, wherein the controller is further configured or programmed to:

cause the unmanned helicopter to move from the end point of the first outgoing path to the start point of the return path by determining the start point of the return path based on the flight orientation of the unmanned helicopter at the end point of the first outgoing path and the first space information, in the first U-turn path; and cause the unmanned helicopter to fly in a reverse direction from the flight orientation at the end point of the first outgoing path in the return path.

4. The control device according to claim 2, further comprising a steering device which steers the unmanned helicopter; wherein the controller is configured or programmed to adjust a flight state of the unmanned helicopter if an amount of operation of the steering device is within a threshold value, or terminate Turn Assist if the amount of operation of the steering device exceeds the threshold value, after the instruction is given to start Turn Assist.

5. The control device according to claim 2, wherein the flight path further includes a second outgoing path and a second U-turn path which connects an end point of the return path and a start point of the second outgoing path with each other, and the controller is further configured or programmed to:

cause the unmanned helicopter to move from the end point of the return path to the start point of the second outgoing path by determining the start point of the second outgoing path based on the flight orientation of the unmanned helicopter at the base point, in the first outgoing path, or in the return path and second space information which indicates a space between the return path and the second outgoing path in the second U-turn path; and cause the unmanned helicopter to fly along the flight orientation at the base point or in the first outgoing path, or cause the unmanned helicopter to fly in a reverse direction from the flight orientation in the return path in the second outgoing path.

6. The control device according to claim 5, wherein the controller is further configured or programmed to:

cause the unmanned helicopter to move from the end point of the return path to the start point of the second outgoing path by determining the start point of the second outgoing path based on the flight orientation of the unmanned helicopter at the end point of the return path and the second space information in the second U-turn path; and cause the unmanned helicopter to fly in a reverse direction from the flight orientation at the end point of the return path in the second outgoing path.

7. The control device according to claim 5, further comprising an end point instruction processor which provides instructions of the end point of the first outgoing path and of the end point of the return path; wherein the controller is configured or programmed to determine the start point of the return path based on the flight orientation of the unmanned helicopter at the end point of the first outgoing path indicated in the instruction by the end point instruction processor and the first space information, and determine the start point of the second outgoing path based on the flight orientation of the unmanned helicopter at the end point of the return path indicated in the instruction by the end point instruction processor and the second space information.

8. The control device according to claim 7, further comprising a spray instruction processor that provides instructions to start and terminate spraying of a spray material;

the spray instruction processor corresponds to the end point instruction processor;

the controller is configured or programmed to start the spraying of the spray material in response to the instruction to start the spraying from the spray instruction processor, and terminate the spraying of the spray material and determine the start point of the return path and the start point of the second outgoing path in response to the instruction to terminate the spraying from the spray instruction processor.

9. The control device according to claim 5, wherein the controller is further configured or programmed to determine the start point of the first outgoing path, triggered by the instruction to start Turn Assist from the instruction processor, determine the end point of the first outgoing path based on the start point of the first outgoing path and distance information which is set in advance; and determine the start point of the return path based on the flight orientation of the unmanned helicopter at the end point of the first outgoing path and the first space information; and the controller is further configured or programmed to determine the end point of the return path based on the start point of the return path and the distance information which is set in advance, determine the start point of the second outgoing path based on the flight orientation of the unmanned helicopter at the end point of the return path and the second space information, and determine the end point of the second outgoing path based on the start point of the second outgoing path and the distance information which is set in advance.

10. The control device according to claim 9, wherein the controller is configured or programmed to start spraying of a spray material at each start point of the first outgoing path, the return path, and the second outgoing path, and terminate the spraying of the spray material at each end point of the first outgoing path, the return path, and the second outgoing path.

11. The control device according to claim 5, further comprising an end point instruction processor which provides an instruction of the end point of the first outgoing path; wherein the controller is further configured or programmed to determine the start point of the first outgoing path, triggered by the instruction to start Turn Assist from the instruction processor, determine distance information based on the start point of the first outgoing path and the end point of the first outgoing path indicated in the instruction by the end point instruction processor, and determine the start point of the return path based on the flight orientation of the unmanned helicopter at the end point of the first outgoing path and the first space information; and the controller is configured or programmed to determine the end point of the return path based on the start point of the return path and the determined distance information, determine the start point of the second outgoing path based on the flight orientation of the unmanned helicopter at the end point of the return path and the second space information, and determine the end point of the second outgoing path based on the start point of the second outgoing path and the determined distance information.

12. The control device according to claim 11, wherein the controller is configured or programmed to start spraying of a spray material at each start point of the first outgoing path, the return path, and the second outgoing path, and terminate the spraying of the spray material at each end point of the first outgoing path, the return path, and the second outgoing path.

13. The control device according to claim 5, wherein the first outgoing path and the second outgoing path are on opposite sides from each other with respect to the return path; and the space between the first outgoing path and the return path is equal or substantially equal to the space between the return path and the second outgoing path.

* * * * *